US012332336B2

(12) United States Patent
Lee

(10) Patent No.: US 12,332,336 B2
(45) Date of Patent: Jun. 17, 2025

(54) SYNTHETIC APERTURE ANTENNA ARRAY FOR 3D IMAGING

(71) Applicant: Aura Intelligent Systems, Inc., Boston, MA (US)

(72) Inventor: Jungah Lee, Boston, MA (US)

(73) Assignee: Aura Intelligent Systems, Inc., Boston, MA (US)

(*) Notice: Subject to any disclaimer, the term of this patent is extended or adjusted under 35 U.S.C. 154(b) by 1007 days.

(21) Appl. No.: 17/250,661

(22) PCT Filed: Aug. 19, 2019

(86) PCT No.: PCT/US2019/047100
§ 371 (c)(1),
(2) Date: Feb. 17, 2021

(87) PCT Pub. No.: WO2020/037321
PCT Pub. Date: Feb. 20, 2020

(65) Prior Publication Data
US 2021/0215817 A1    Jul. 15, 2021

Related U.S. Application Data

(60) Provisional application No. 62/719,440, filed on Aug. 17, 2018.

(51) Int. Cl.
*G01S 13/42* (2006.01)
*G01S 7/03* (2006.01)
*G01S 13/931* (2020.01)

(52) U.S. Cl.
CPC ............. *G01S 13/426* (2013.01); *G01S 7/03* (2013.01); *G01S 13/931* (2013.01)

(58) Field of Classification Search
CPC ............. G01S 13/90–9094; G01S 7/03; G01S 13/426; G01S 13/931; G01S 13/347; H04B 7/0413
See application file for complete search history.

(56) References Cited

U.S. PATENT DOCUMENTS 9,806,777 B1 * 10/2017 Doostnejad .......... H04B 7/0617
11,802,958 B2 * 10/2023 Levitan ................ G01S 13/931
(Continued)

FOREIGN PATENT DOCUMENTS

CN    101248608 A    8/2008
CN    103592647 A    2/2014
(Continued)

OTHER PUBLICATIONS

W.-Q. Wang, "Space-Time Coding MIMO-OFDM SAR for High-Resolution Imaging," in IEEE Transactions on Geoscience and Remote Sensing, vol. 49, No. 8, pp. 3094-3104, Aug. 2011, doi: 10.1109/TGRS.2011.2116030. (Year: 2011).*
(Continued)

*Primary Examiner* — Matthew M Barker

(57) ABSTRACT

A method of an advanced communication apparatus (102, 116) in a wireless communication system (100) is provided. The method comprises generating a digital waveform with a polyphase coding based on a multi-input multi-output (MIMO) and orthogonal frequency division multiplexing (OFDM) processing, processing the digital waveform with beamforming in Azimuth, modulating the processed digital waveform using a predetermined modulation function, transmitting, to a target object (1413, 1514, 1614) via a transmit antenna (1412, 1513, 1613) comprising at least one one-dimensional (1D) linear array in Azimuth, a first signal that is modulated by the predetermined modulation function, and receiving a second signal via a receive antenna that is constructed from one or more 1D arrays in elevation, wherein the second signal is reflected or backscattered from the target object.

20 Claims, 21 Drawing Sheets

(56) References Cited

U.S. PATENT DOCUMENTS

| | | | |
|---|---|---|---|
| 2005/0180315 | A1 | 8/2005 | Chitrapu et al. |
| 2012/0142400 | A1 | 6/2012 | Lo et al. |
| 2013/0214961 | A1 | 8/2013 | Lee et al. |
| 2014/0125511 | A1 | 5/2014 | Longstaff |
| 2018/0212664 | A1* | 7/2018 | Kim .............. H04B 7/0639 |
| 2018/0227022 | A1* | 8/2018 | Kim .............. H04B 7/0478 |

FOREIGN PATENT DOCUMENTS

| | | | |
|---|---|---|---|
| CN | 104011558 | A | 8/2014 |
| CN | 104166123 | A | 11/2014 |
| CN | 104678395 | A | 6/2015 |
| CN | 105429686 | A | 3/2016 |
| CN | 104166123 | B | 7/2016 |
| CN | 105824021 | A | 8/2016 |
| CN | 107332801 | A | 11/2017 |
| EP | 3179266 | A1 | 6/2017 |
| EP | 3339894 | A1 | 6/2018 |

OTHER PUBLICATIONS

Chinese National Intellectual Property Administration, First Office Action issued Jun. 30, 2023 regarding Application No. 201980068745.2, 12 pages.

Japanese Patent Office, Office Action issued Aug. 16, 2023 regarding Application No. 2021-532288, 11 pages.

Sato et all., "A Study of Unequally-Spaced MIMO Radar Module realizing Three Dimensional Scanning", Institute of Electronics, Information and Communication Engineers, 2017 Electronics Society Convention Lecture Collected Papers, Aug. 2017, pp. S-11-S-12.

Extended European Search Report issued Mar. 25, 2022 regarding Application No. 19849762.0, 11 pages.

Cao et al., "IRCI free range reconstruction for co-located MIMO-OFDM radar", 2015 IEEE China Summit and International Conference on Signal and Information Processing (ChinaSIP) , Jul. 2015, pp. 314-318.

International Search Report and Written Opinion regarding International Application No. PCT/US2019/047100, issued Nov. 21, 2019, 7 pages.

Brookner, "MIMO radar demystified and where it makes sense to use", 2014 IEEE International Conference on Acoustics, Speech and Signal Processing (ICASSP), May 2014, pp. 5329-5333.

Harter, et al., "2-D Antenna Array Geometries for MIMO Radar Imaging by Digital Beamforming", Proceedings of the 10th European Radar Conference, Oct. 2013, pp. 383-386.

Gabillard, et al., "Comparative Study of 2D Grid Antenna Array Geometries for Massive Array Systems", 2015 IEEE Globecom Workshops, Dec. 2015, 6 pages.

Japanese Patent Office, Office Action issued Jan. 30, 2024 regarding Application No. 2021-532288, 4 pages.

Chinese National Intellectual Property Administration, Second Office Action issued Feb. 28, 2024 regarding Application No. 201980068745.2, 15 pages.

Korean Intellectual Property Office, Office Action issued Nov. 4, 2024 regarding Application No. 10-2021-7007830, 15 pages.

Yan et al., "Optimization of Polyphase Codes Based on Weighted Cyclic Algorithm for Synthetic Aperture Radar", IET International Radar Conference 2015, Oct. 2015, 5 pages.

\* cited by examiner

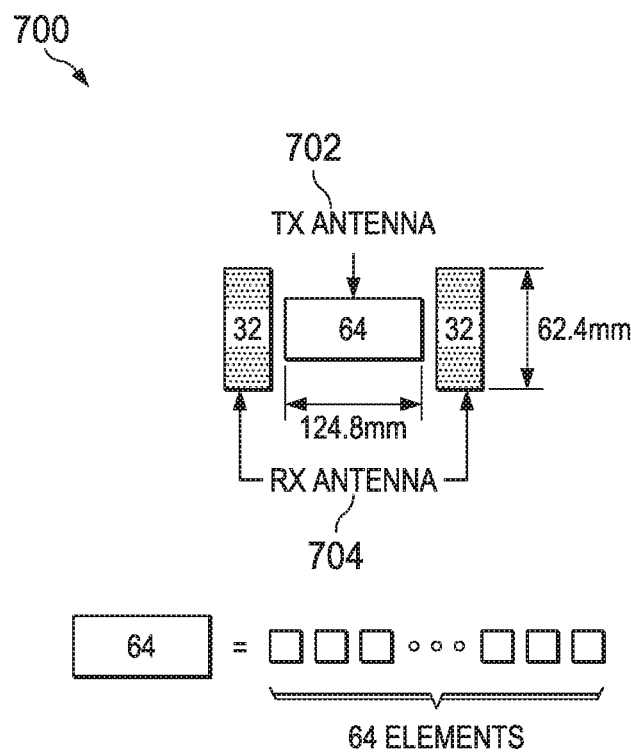
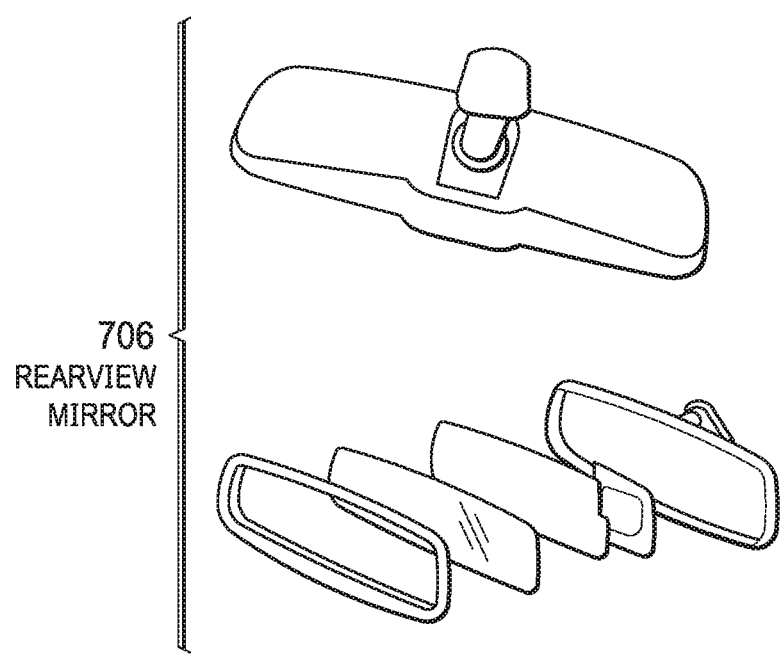
FIG. 7

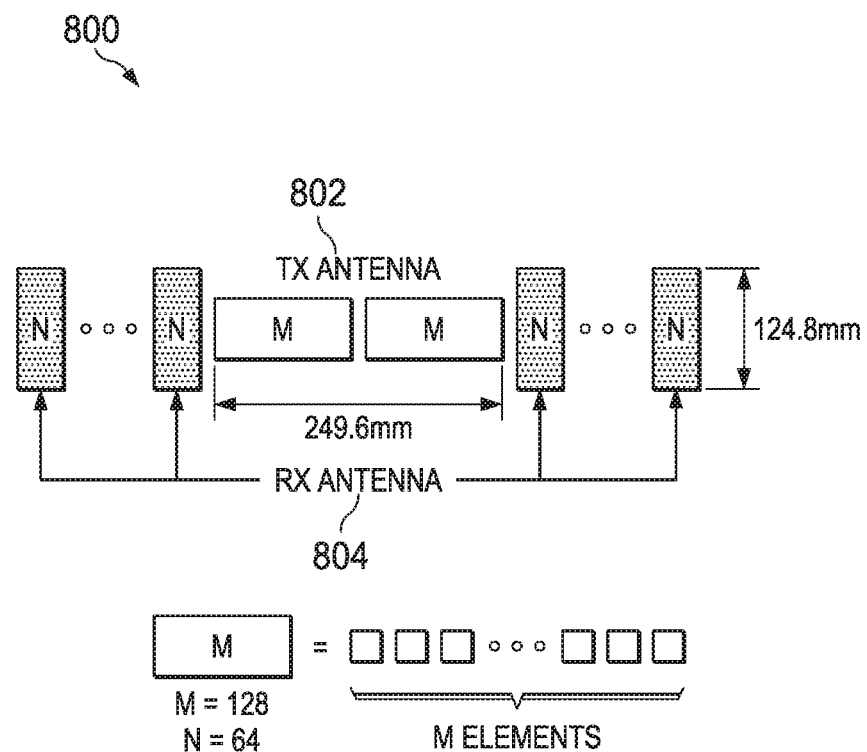
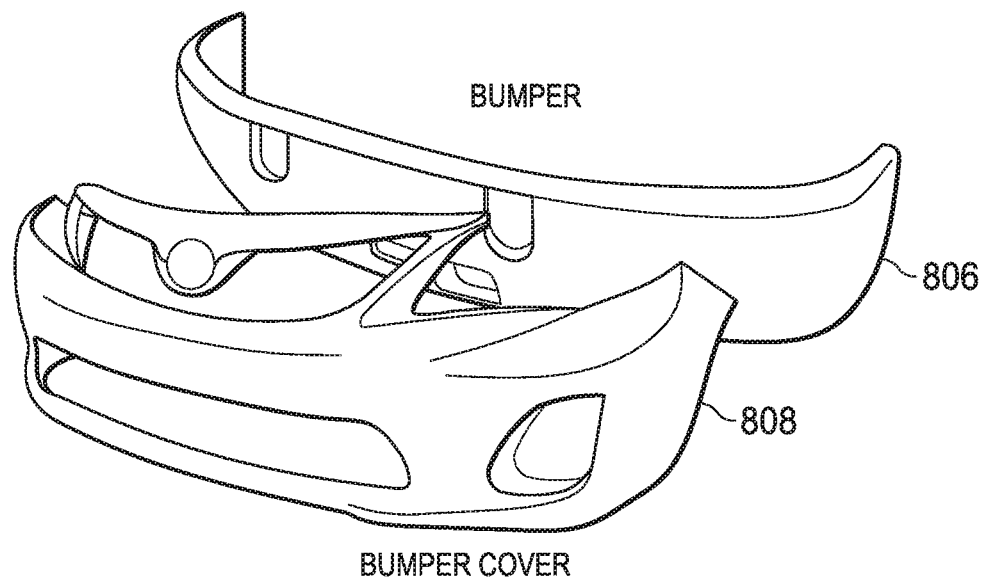
FIG. 8

SYNTHETIC APERTURE ANTENNA ARRAY FOR 3D IMAGING

CROSS-REFERENCE TO RELATED APPLICATIONS AND CLAIM OF PRIORITY

This application is a 371 National Stage Application of International Application No. PCT/US2019/047100 filed on Aug. 19, 2019, which claims priority to U.S. Provisional Patent Application Ser. No. 62/719,440, filed on Aug. 17, 2018, the disclosures of which are herein incorporated by reference in their entirety.

TECHNICAL FIELD

The present disclosure generally relates to an antenna array design and beamforming. More specifically, the present disclosure relates to a synthetic aperture antenna array design and beamforming for 3D imaging, localization, and positioning.

BACKGROUND

A design of the antenna array in a wireless communication system is one of the most important factors that provide higher performance, for example, in 3-dimensional (3D) imaging, localization, and positioning. A synthetic aperture antenna array based on multiple-input multiple-output (MIMO) employs multiple antennas to transmit and receive orthogonal waveforms. Such synthetic aperture antenna array and beamforming may be applied for radar and Lidar image processing, imaging/positioning/localization for industrial automation, robotic vision, localization and positioning for communication systems, and antenna array designs for mobile devices and communication systems.

SUMMARY

The present disclosure provides synthetic aperture antenna array design and beamforming for 3D imaging, localization and positioning.

In one embodiment, an advanced communication apparatus in a wireless communication system is provided. The advanced communication apparatus comprises a processor and a three-dimensional (3D) imaging sensor operably connected to the processor, the 3D imaging sensor comprising a digital circuit configured to: generate a digital waveform with a polyphase coding based on a multi-input multi-output (MIMO) and orthogonal frequency division multiplexing (OFDM) processing, process the digital waveform with beamforming in Azimuth, and modulate the processed digital waveform using a predetermined modulation function. The advanced communication apparatus in the wireless communication system further comprises a transceiver operably connected to the digital circuit and the processor, the transceiver configured to: transmit, to a target object via a transmit antenna comprising at least one one-dimensional (1D) linear array in Azimuth, a first signal that is modulated by the predetermined modulation function, and receive a second signal via a receive antenna that is constructed from one or more 1D arrays in elevation, wherein the second signal is reflected or backscattered from the target object.

In another embodiment, a method of an advanced communication apparatus in a wireless communication system is provided. The method comprises: generating a digital waveform with a polyphase coding based on a multi-input multi-output (MIMO) and orthogonal frequency division multiplexing (OFDM) processing; processing the digital waveform with beamforming in Azimuth; modulating the processed digital waveform using a predetermined modulation function; transmitting, to a target object via a transmit antenna comprising at least one one-dimensional (1D) linear array in Azimuth, a first signal that is modulated by the predetermined modulation function; and receiving a second signal via a receive antenna that is constructed from one or more 1D arrays in elevation, wherein the second signal is reflected or backscattered from the target object.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example automotive antenna design according to embodiments of the present disclosure;

FIG. 8 illustrates another example automotive antenna design according to embodiments of the present disclosure;

DETAILED DESCRIPTION

FIG. 1 through FIG. 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
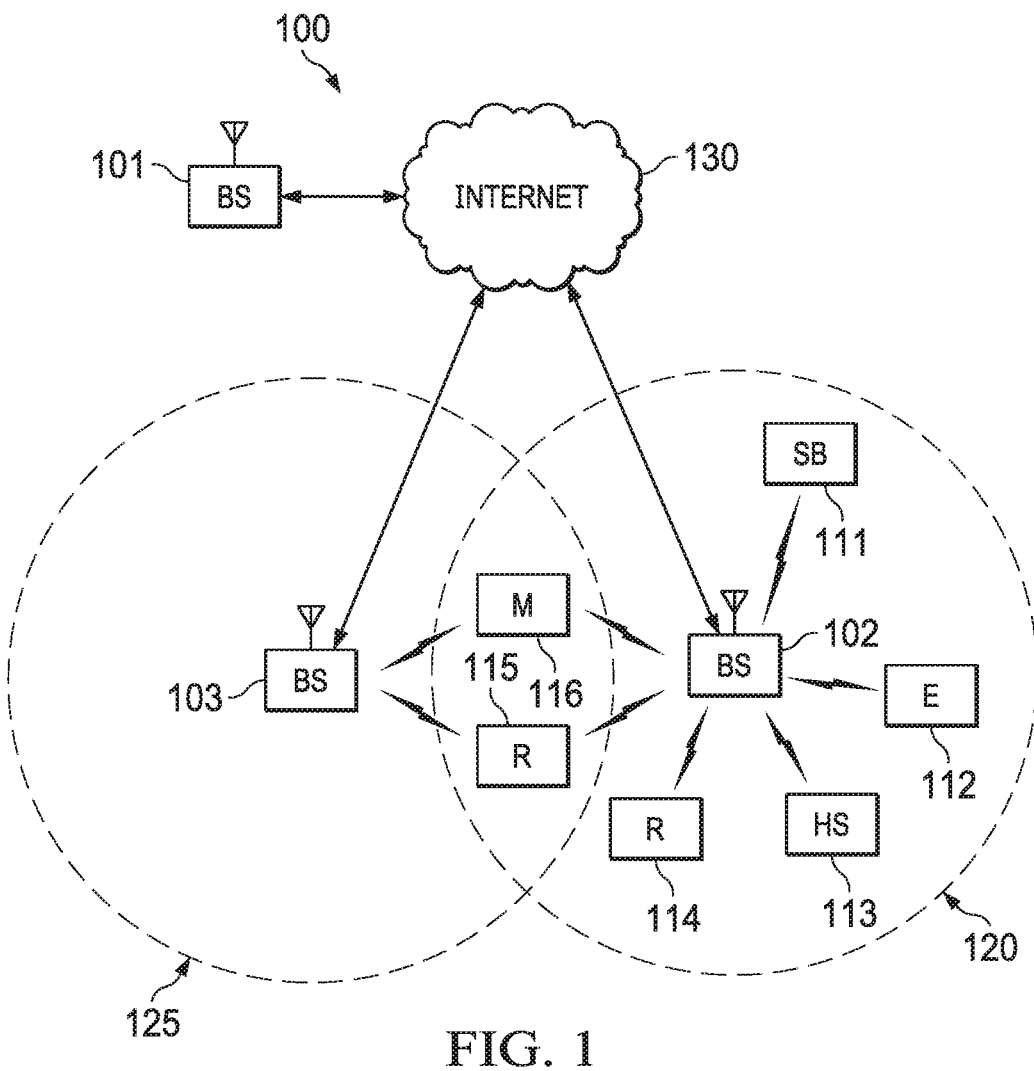
FIG. 1 illustrates an example wireless network according to embodiments of the present disclosure.
Figure 2:
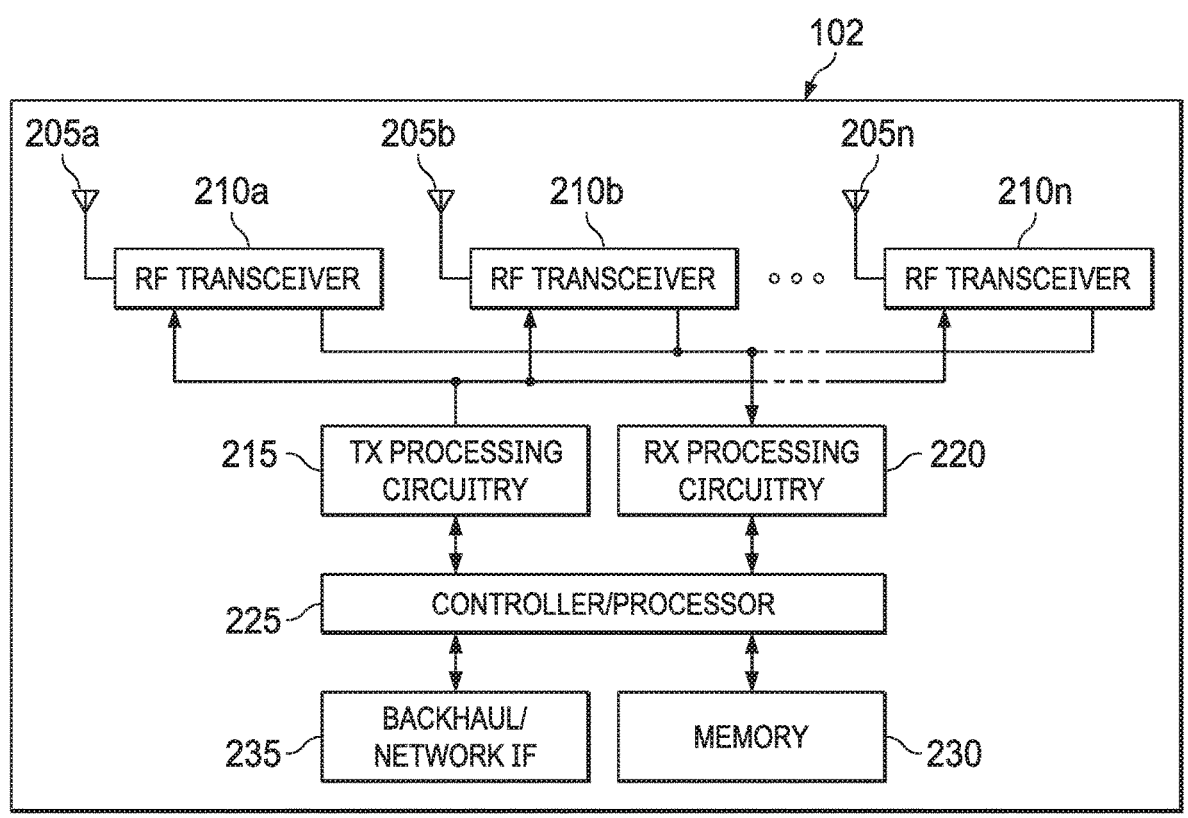
FIG. 2 illustrates an example gNB according to embodiments of the present disclosure.
Figure 3:
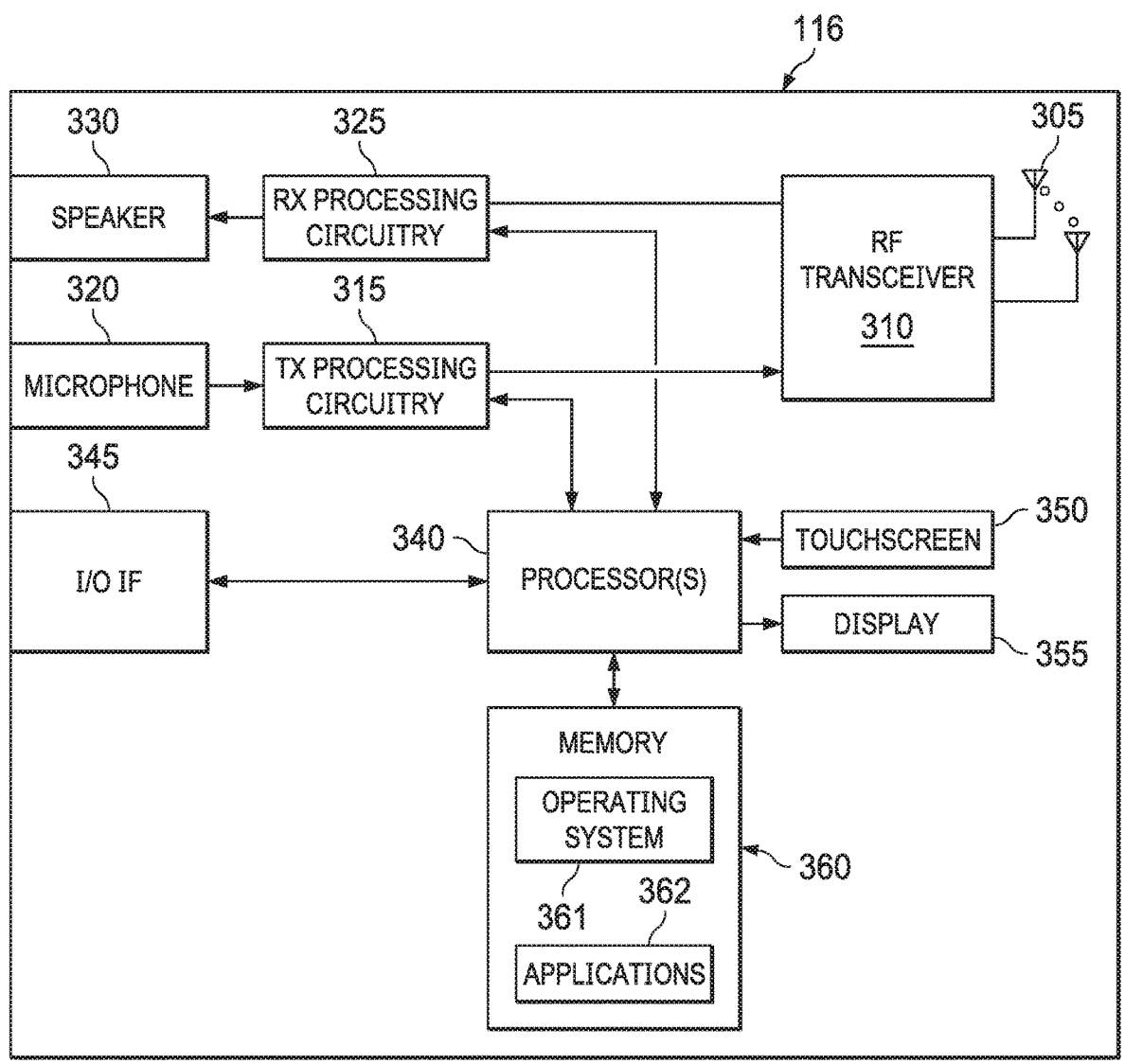
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient synthetic aperture antenna array design and beamforming for 3D imaging, localization, and positioning in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

Figure 14:
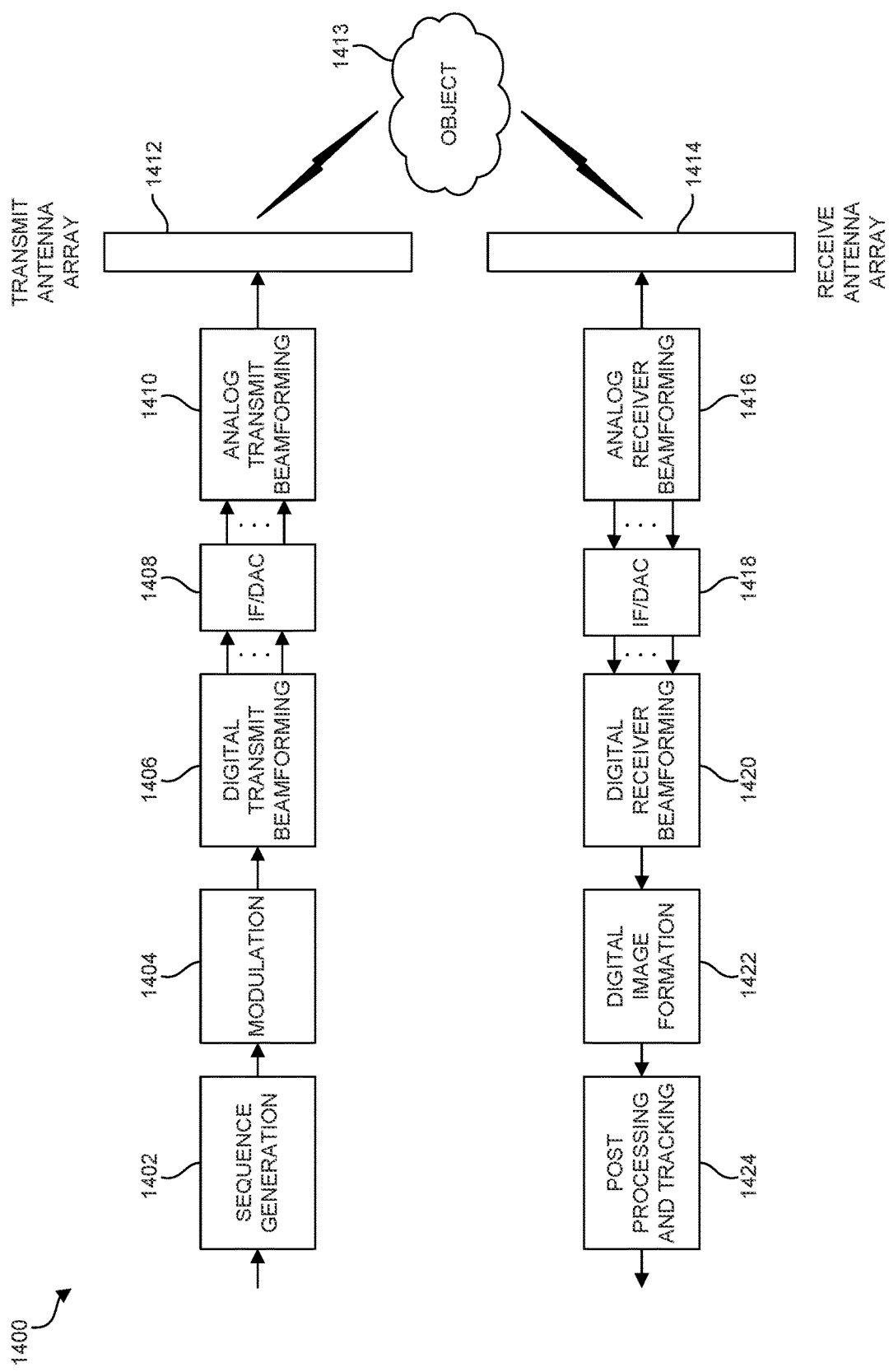
FIG. 14 illustrates an example hybrid beamforming general according to embodiments of the present disclosure.
Figure 15:
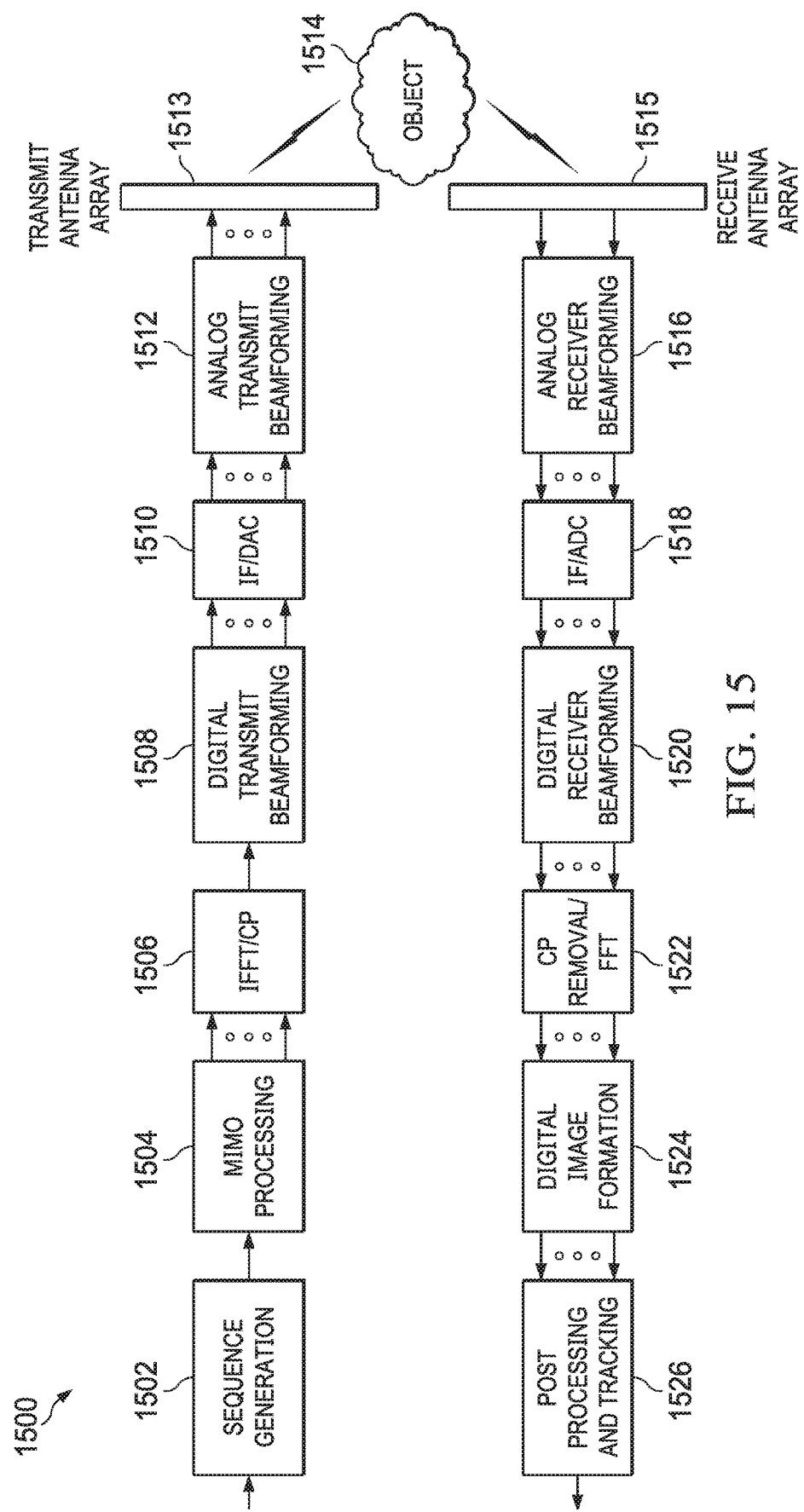
FIG. 15 illustrates an example hybrid beamforming with MIMO OFDM waveform according to embodiments of the present disclosure.
Figure 16:
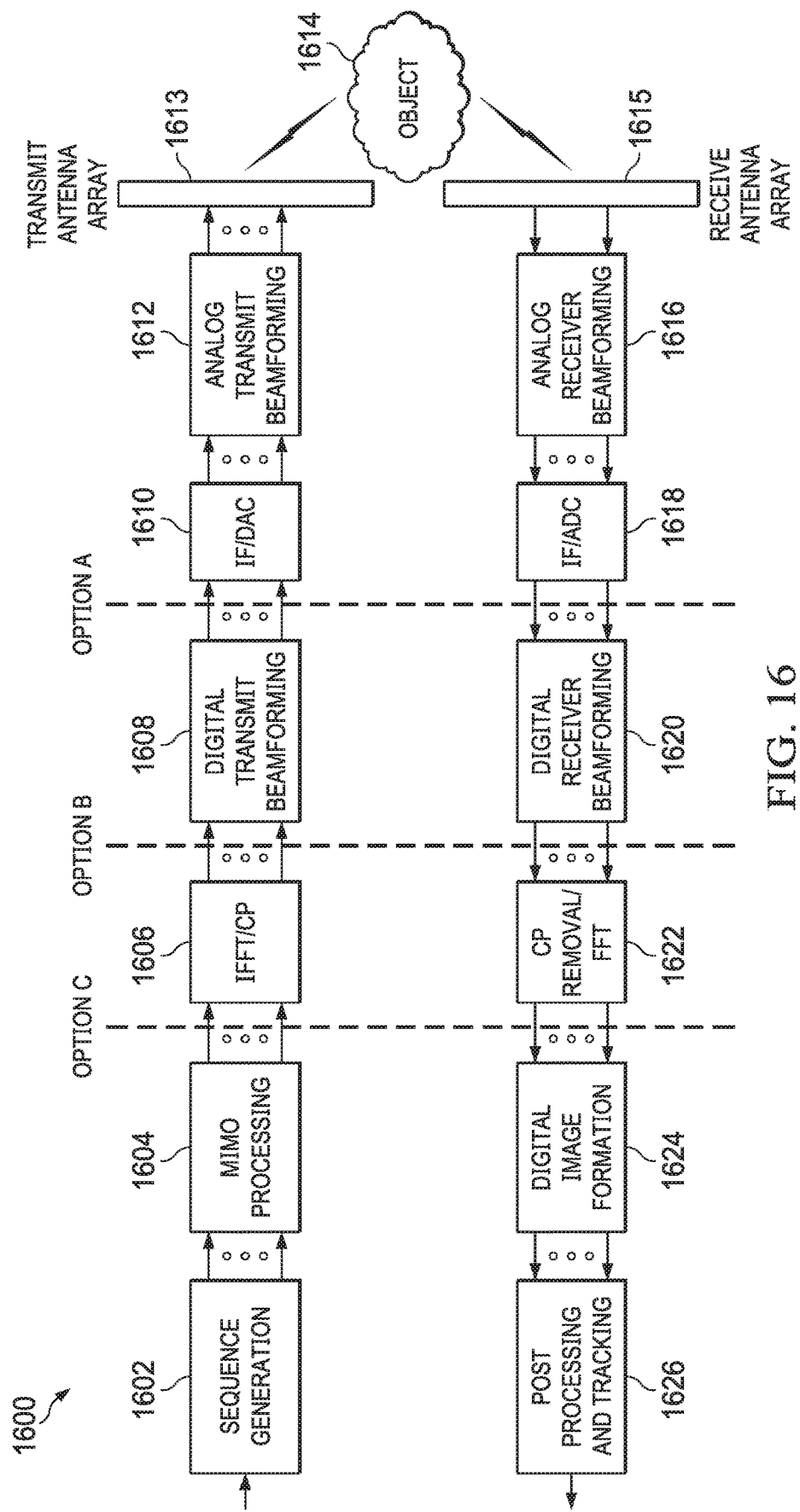
FIG. 16 illustrates an example hybrid beamforming implementation architecture with MIMO OFDM waveform according to embodiments of the present disclosure.

An advanced communication apparatus may refer to a transmitter or receiver array in FIGS. 14, 15, and 16 providing hybrid beamforming operation based on all functional blocks, and may be implemented in FIG. 2 as a part of a base station (BS, gNB) or FIG. 3 as a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Radar is used in defense and automotive applications. These systems still rely on analog waveform and circuits to get reflected signal and process to obtain spatial and Doppler information.

The embodiments of this disclosure recognize and takes into account that, in high-resolution digital radar, analog-to-digital converting/digital-to-analog converting (ADC/DAC), analog processing complexity, and power consumption should be considered due to large bandwidth requirements. Specifically, because the ADC is the most power consuming block in the receiver, the power saving remedies are required. In addition, the complexity for the implementation of the system is also required. In conventional radar system, for example high resolution imaging radar, many antenna elements are required to obtain high resolution so that hardware cost and power consumption are required.

Various embodiments of this disclosure provide a hybrid beamforming approach with wideband analog beamforming in the front-end that may reduce a number of physical channels required, reducing the complexity and power consumption significantly, particularly required for in automotive applications.

Various embodiments of this disclosure provide a 4D imaging radar that may display point cloud of 3D (x, y, z) and Doppler information using digital waveform (e.g., OFDM based). Various embodiments of this disclosure provide full digital processing to provide high resolution and interference immune imagery without artifacts.

Various embodiments of this disclosure provide technologies to allow simultaneous imaging for near and far fields, unlike conventional automotive radars.

Various embodiments of this disclosure provide a 2D MIMO antenna (e.g., MIMO, 2D virtual MIMO) with virtualized receiver antenna design and processing that may reduce a number of physical channels significantly while preserving the resolution.

Various embodiments of this disclosure provide, for in building applications where the speed of the object is limited, a single (or a few) transmit-receive antenna pair while physically moving the transmitter/receiver synthesizes large aperture, however, various embodiments of this disclosure may keep the hardware requirements of the imaging system low.

Various embodiments of this disclosure provide high-resolution radars, with a resolution similar to optical systems such as Lidars requiring a large antenna aperture size.

Various embodiments of this disclosure provide processing architecture, the hybrid beamforming, and 2D virtual MIMO that allow a digital interface between the front-end module (e.g., circuit) and the baseband processing module (e.g., circuit) that can work for a large array size. In one example, an antenna array spans the bumper width or the width of the window.

Figure 4:
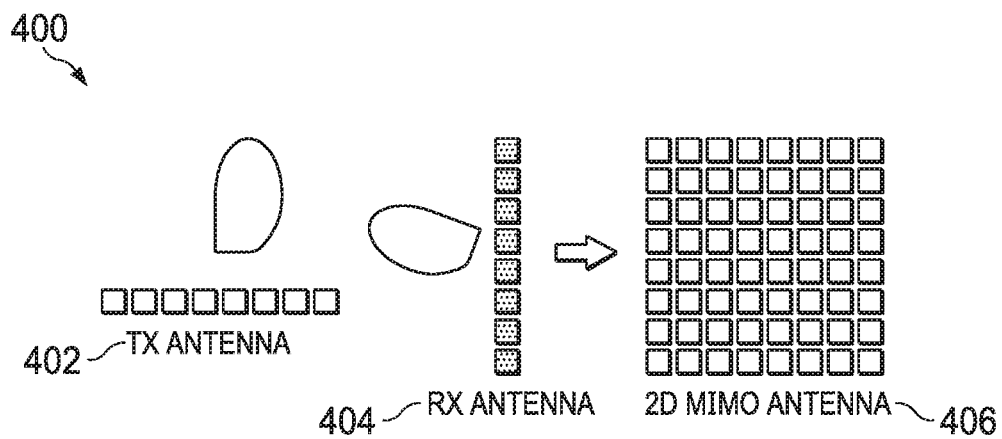
FIG. 4 illustrates an example 2D MIMO antenna array for imaging according to embodiments of the present disclosure.

FIG. 4 illustrates an example 2D virtual MIMO antenna array for imaging 400 according to embodiments of the present disclosure. The embodiment of the 2D virtual antenna array for imaging 400 illustrated in FIG. 4 is for illustration only. FIG. 4 does not limit the scope of this disclosure to any particular implementation.

As illustrated in FIG. 4, a 2D virtual MIMO antenna array for imaging includes a transmit (Tx) antenna 402, a receive (Rx) antenna 404, and a 2D MIMO antenna 406. At a transmitter, Azimuth beamforming with one dimensional (1D) linear array is performed and a sequential scanning is performed in Azimuth. At a receiver, a vertical beamforming for vertical resolution is performed. As illustrated in FIG. 4, 64 channel angles of arrival (AoA) antennas are provided.

In one embodiment, a 2D virtual antenna array can use a MIMO antenna array (e.g., 2/4/8 orthogonal channels). As discussed above, a 2D virtual antenna array may have benefits, for example, reduction from $N^2$ paths to 2N paths (e.g., small number of ADC/DAC and lower power consumption in transceiver), antenna size reduction and antenna design, and associated reduction in circuitry for DAC/ADC, IF and power consumption.

Figure 5:
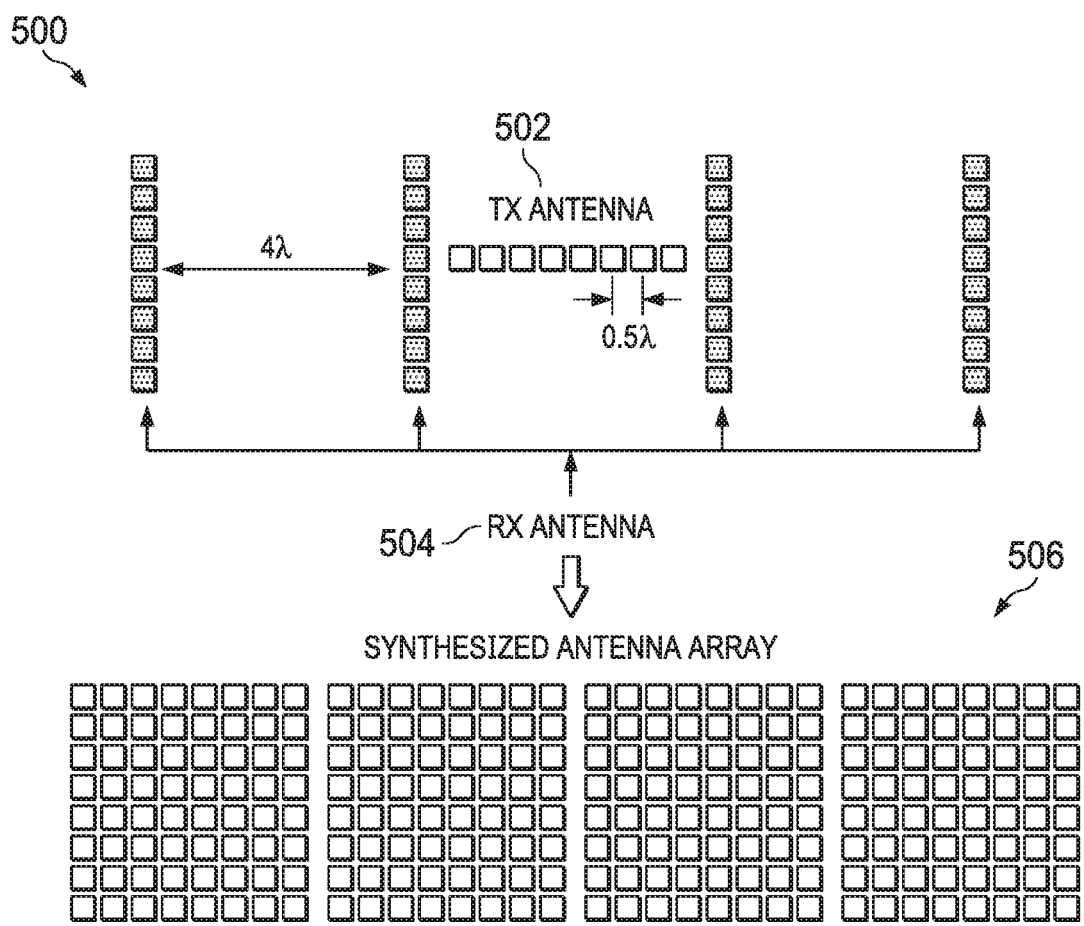
FIG. 5 illustrates an example synthesizing larger aperture in Azimuth with 2D MIMO virtual antenna array according to embodiments of the present disclosure.

FIG. 5 illustrates an example synthesizing larger aperture in Azimuth with 2D MIMO virtual antenna array 500 according to embodiments of the present disclosure. As illustrated in FIG. 5, transmit antenna 502 is a 1-D array in Azimuth direction, and the receive antenna array 504 comprises multiple N antenna column arrays, comprising 1D antenna array with M antenna elements (e.g. synthesized antenna array 506). The embodiment of the synthesizing larger aperture in Azimuth 500 illustrated in FIG. 5 is for illustration only. FIG. 5 does not limit the scope of this disclosure to any particular implementation. The transmit and receive antenna arrays may be co-located in mono-static radar as illustrated in FIG. 5 or may be located in different locations in bi-static radar while illuminating the same target area. In one example, the distance between Rx Antenna 504 is 4λ, however other distances may be used. In one example, the distance between Tx Antenna array 502 is 0.5λ, however other distances may be used.

Figure 6:
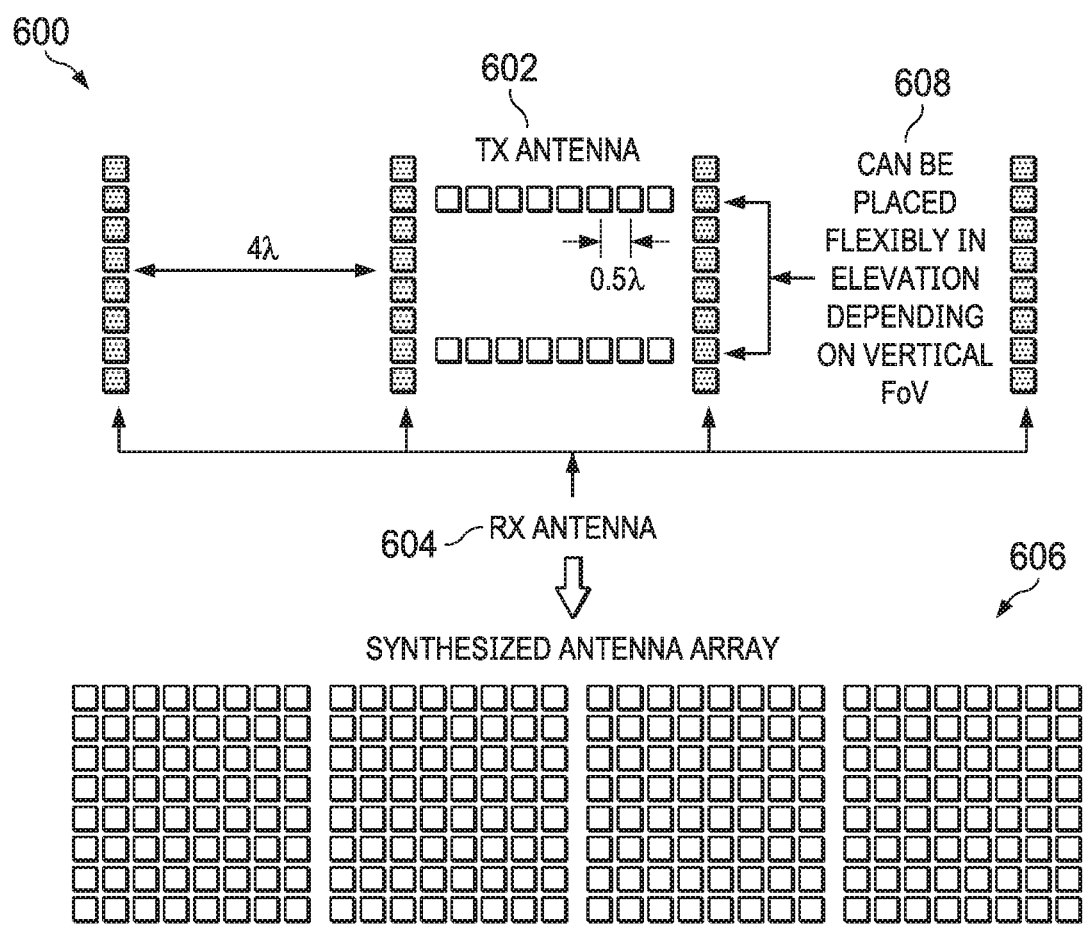
FIG. 6 illustrates another example synthesizing larger aperture in Azimuth with 2D MIMO virtual antenna array according to embodiments of the present disclosure.

FIG. 6 illustrates another example synthesizing larger aperture in Azimuth with 2D MIMO virtual antenna array 600 according to embodiments of the present disclosure. The embodiment of the synthesizing larger aperture in Azimuth 600 illustrated in FIG. 6 is for illustration only. FIG. 6 does not limit the scope of this disclosure to any particular implementation. The transmit and receive antenna arrays may be co-located in mono-static radar as illustrated in FIG. 6 or may be located in different locations in bi-static radar, while illuminating the same target area.

FIGS. 5 and 6 illustrate an example synthesizing larger aperture in Azimuth in accordance with the present disclosure. As illustrated in FIG. 5, the number of transmit paths is reduced from $M^2N$ to M+MN where M is antenna array size and N is number of Rx antenna columns). For example, for M=8 and N=4, 320 paths are reduced to 40 paths (e.g., saving by 88%) and for M=8 and N=8, 512 paths are reduced to 72 paths (e.g., saving by 86%). As illustrated in FIG. 6, synthesizing larger aperture in Azimuth comprises a Tx antenna 602, an Rx antenna 604, and synthesized antenna array 606. In one example, the distance between Rx Antenna 604 is 4λ, however other distances may be used. In one example, the distance between Tx Antenna array 602 is 0.5λ, however other distances may be used.

As illustrated in FIG. 6 illustrates synthesizing larger aperture in Azimuth that may provide adjustable vertical antenna pointing angle and field of view by transmit beamforming between the two antenna arrays. For example, two Tx antenna arrays as shown by reference 608.

FIG. 7 illustrates an example automotive antenna design 700 according to embodiments of the present disclosure. The embodiment of the automotive antenna design 700 illustrated in FIG. 7 is for illustration only. FIG. 7 does not limit the scope of this disclosure to any particular implementation. As illustrated in FIG. 7, the automotive antenna design 700 comprises a Tx antenna 702, an Rx antenna 704, and a rearview mirror 706. In one example, the Tx Antenna may have 32 elements in the vertical array and 64 elements in the horizontal array. In such an example, the horizontal array width may be 124.8 mm, and may be other widths in other examples. In such an example, the vertical array width may be 62.4 mm, and may be other widths in other examples.

FIG. 8 illustrates another example automotive antenna design 800 according to embodiments of the present disclosure. The embodiment of the automotive antenna design 800 illustrated in FIG. 8 is for illustration only. FIG. 8 does not limit the scope of this disclosure to any particular implementation. In one example, the Tx Antenna may have two sets of array elements. In one example, each horizontal set may include 128 elements and each vertical set may include 64 elements. In other embodiments, other number of elements may be used. In such an example, the horizontal array width may be 249.6 mm for both sets total, and may be other widths in other examples. In such an example, the vertical array width may be 124.8 mm, and may be other widths in other examples.

As illustrated in FIG. 7, a 64×32 virtual array is shown for an automotive antenna design, for example, at 77 GHz. As illustrated in FIG. 7, the 64×32 virtual array includes an antenna panel for Tx comprising 64 elements in Azimuth and 64 element arrays in elevation, and 2 vertical arrays for Rx. As illustrated in FIG. 8, the automotive antenna design 800 comprises a Tx antenna 802, an Rx antenna 804, a bumper 806, and a bumper cover 808.

As illustrated in FIG. 8, a 1024×64 virtual array is shown for an automotive antenna design, for example, at 77 GHz. As illustrated in FIG. 8, the 1024×64 virtual array includes an antenna panel for Tx comprising 128 elements in Azimuth and 8 vertical arrays for Rx comprising 64 elements in elevation. The 1024×64 virtual array as illustrated in FIG. 8 can be extended to include two or more Tx antenna arrays (rows) for adjustable vertical antenna pointing angle and field of view. As used herein, M elements can be the horizontal elements and N is the vertical elements.

Figure 9:
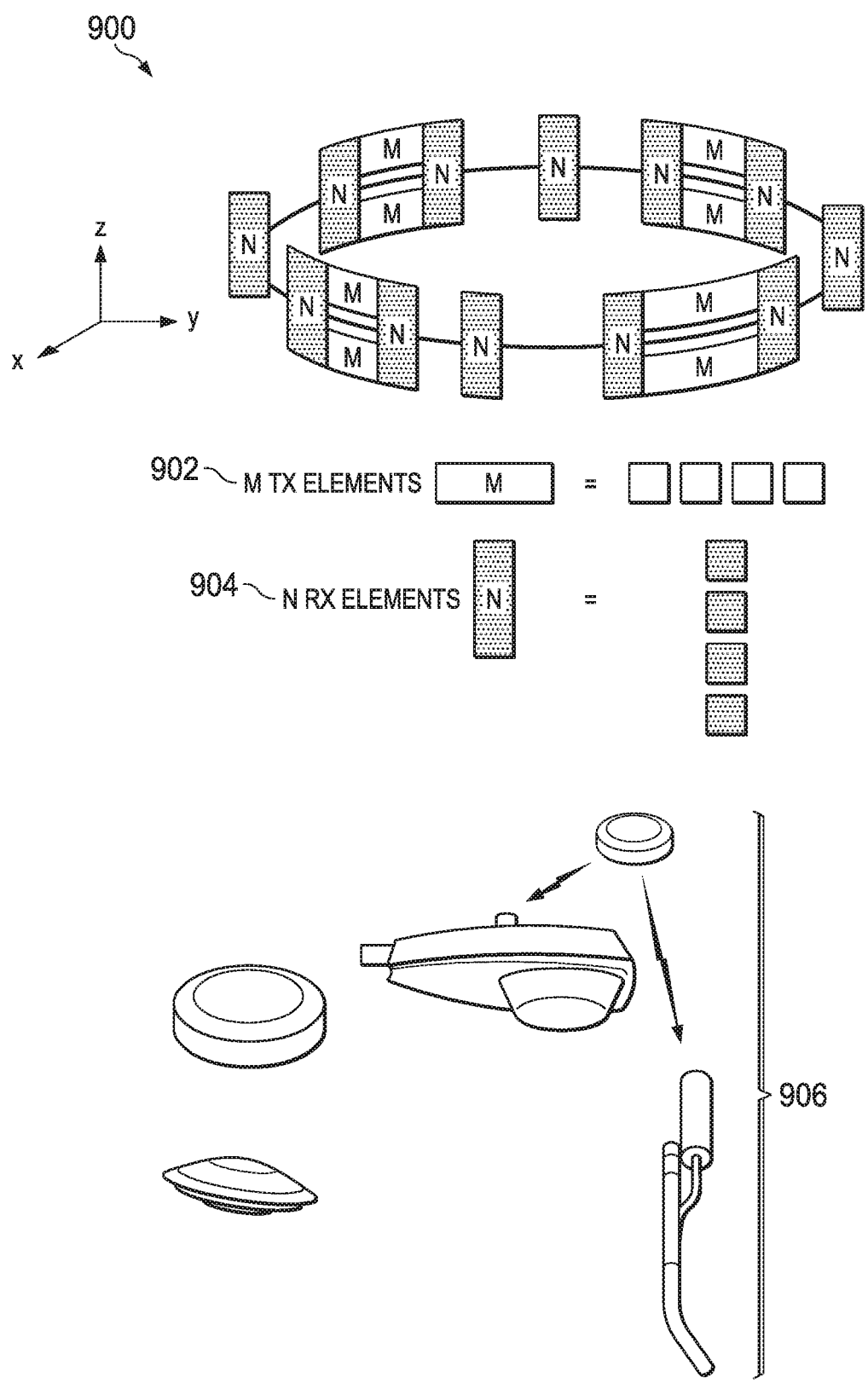
FIG. 9 illustrates an example virtual 2D circular antenna array according to embodiments of the present disclosure.

FIG. 9 illustrates an example virtual 2D circular antenna array 900 according to embodiments of the present disclosure. The embodiment of the virtual 2D circular antenna array 900 illustrated in FIG. 9 is for illustration only. FIG. 9 does not limit the scope of this disclosure to any particular implementation. As illustrated in FIG. 9, the virtual 2D circular antenna array 900 comprises M Tx elements 902 and N Rx elements 904.

As illustrated in FIG. 9, a set of configurations 906 including a pole, a lamp post, and a rooftop installation can achieve 360 degree coverage.

Figure 10:
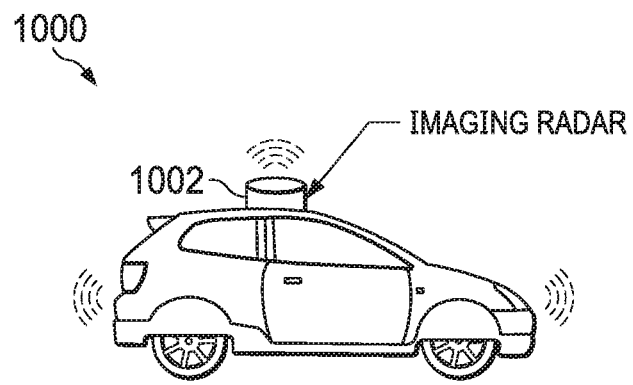
FIG. 10 illustrates an example automotive installation of imaging radar according to embodiments of the present disclosure.

FIG. 10 illustrates an example automotive installation of imaging radar 1000 according to embodiments of the present disclosure. The embodiment of the automotive installation of imaging radar 1000 illustrated in FIG. 10 is for illustration only. FIG. 10 does not limit the scope of this disclosure to any particular implementation.

As illustrated in FIG. 10, multiple options for installing imaging radar 1002 on the rooftop can be provided for an automotive object.

Figure 11:
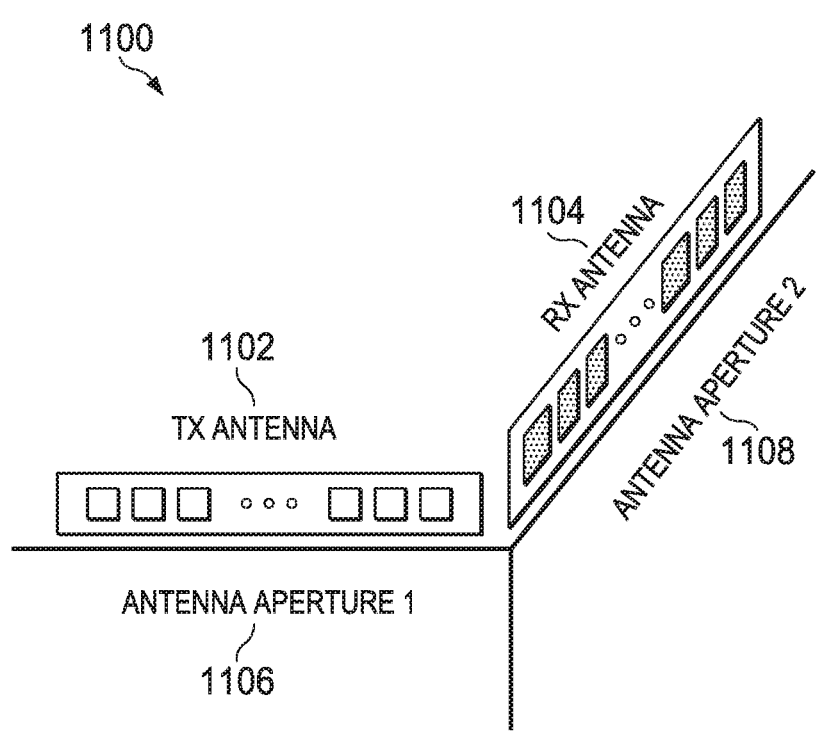
FIG. 11 illustrates an example in-building installation according to embodiments of the present disclosure.

FIG. 11 illustrates an example in-building installation 1100 according to embodiments of the present disclosure. The embodiment of the in-building installation 1100 illustrated in FIG. 11 is for illustration only. FIG. 11 does not limit the scope of this disclosure to any particular implementation.

Figure 12:
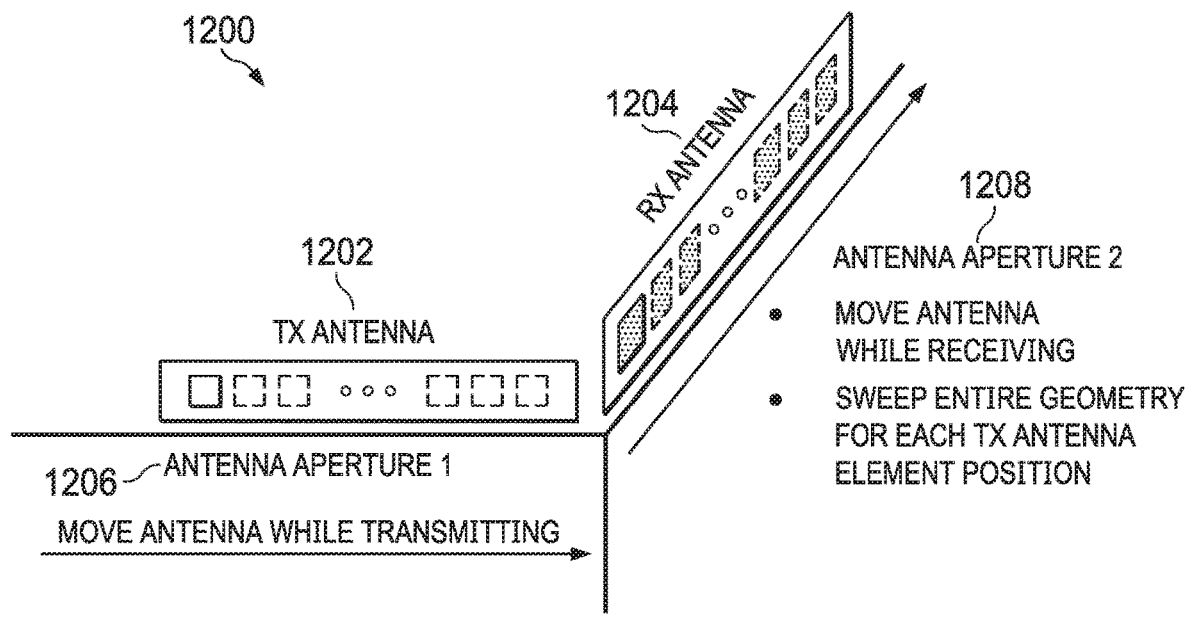
FIG. 12 illustrates an example factory automation according to embodiments of the present disclosure.

FIG. 12 illustrates an example factory automation 1200 according to embodiments of the present disclosure. The embodiment of the factory automation 1200 illustrated in FIG. 12 is for illustration only. FIG. 12 does not limit the scope of this disclosure to any particular implementation. In FIG. 12, as Tx antenna 1202 moves while transmitting and Rx antenna 1204 moves while receiving, the system sweeps the entire geometry for each Tx antenna element position.

As illustrated in FIG. 11, antennas can be installed in rectangular arrangement such as along 2 corners for in-building installation and factory automation and mapping applications. As illustrated in FIG. 11, a transmission is performed using a transmit (Tx) antenna 1102 comprising antenna array 1 1106 and a reception is performed using a receive (Rx) antenna 1104 comprising antenna array 2 1108 while illuminating the target area.

In one embodiment, a transmission is performed using a transmit (Tx) antenna comprising antenna aperture 2 and a reception is performed using a receive (Rx) antenna comprising antenna aperture 1.

In another embodiment, a transmission is performed using a transmit (Tx) antenna comprising antenna aperture 1 and a reception is performed using a receive (Rx) antenna comprising antenna aperture 2.

As illustrated in FIG. 12, at least one antenna element per aperture can be implemented. In one embodiment, an antenna element in aperture 1 moves along an x-axis while transmitting signal illuminating objects in a room. In such embodiment, the signal for each antenna element is weighted according to beamforming equation illustrated in FIG. 18, FIG. 19, and FIG. 20, synthesizing a large 2D antenna aperture given by the present disclosure. As illustrated in FIG. 12, a transmission is performed using a transmit (Tx) antenna 1202 comprising antenna array 1 1206 and a reception is performed using a receive (Rx) antenna 1204 comprising antenna array 2 1208 while illuminating the target area.

Figure 18:
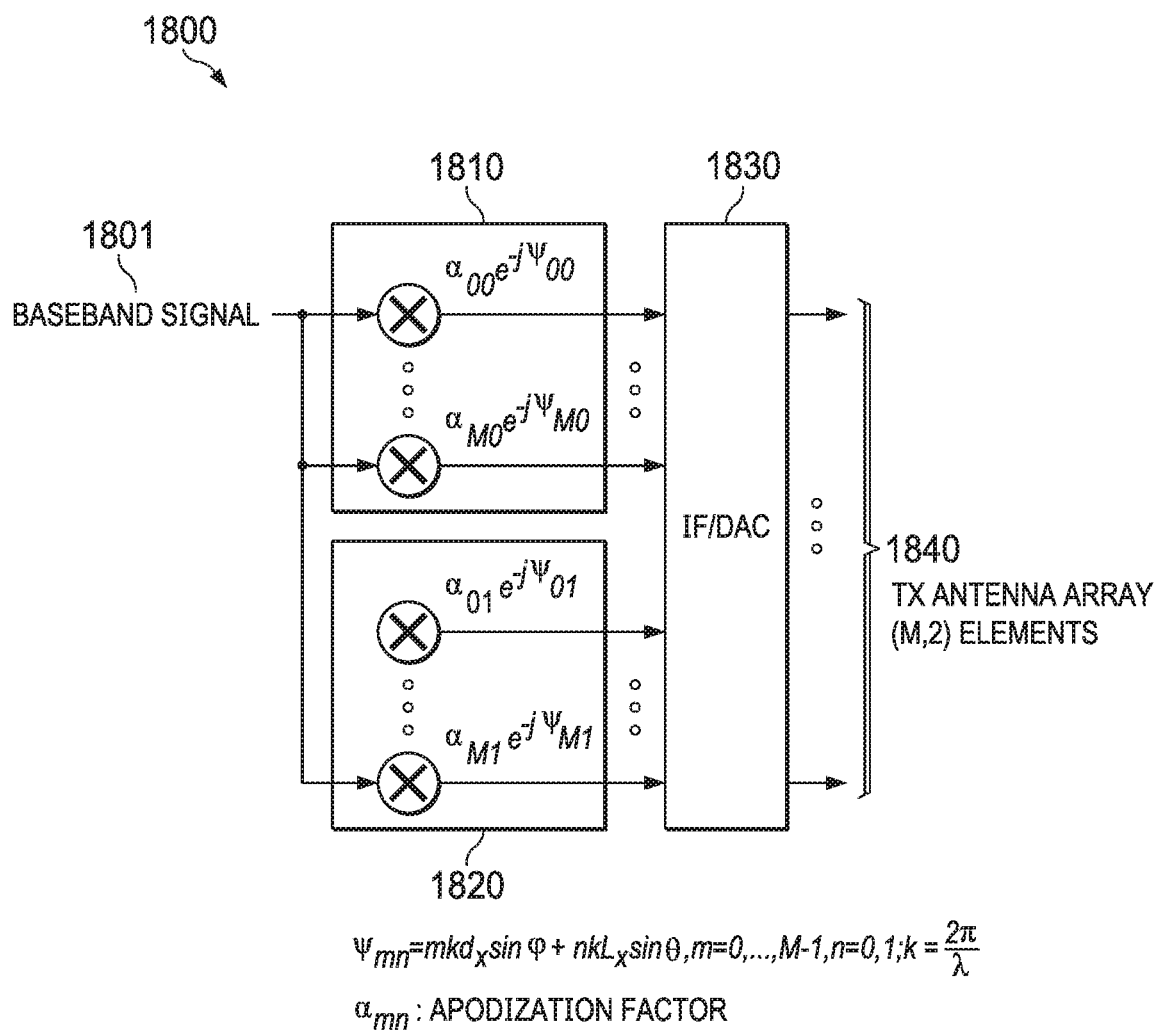
FIG. 18 illustrates an example transmit beamforming according to embodiments of the present disclosure.
Figure 19:
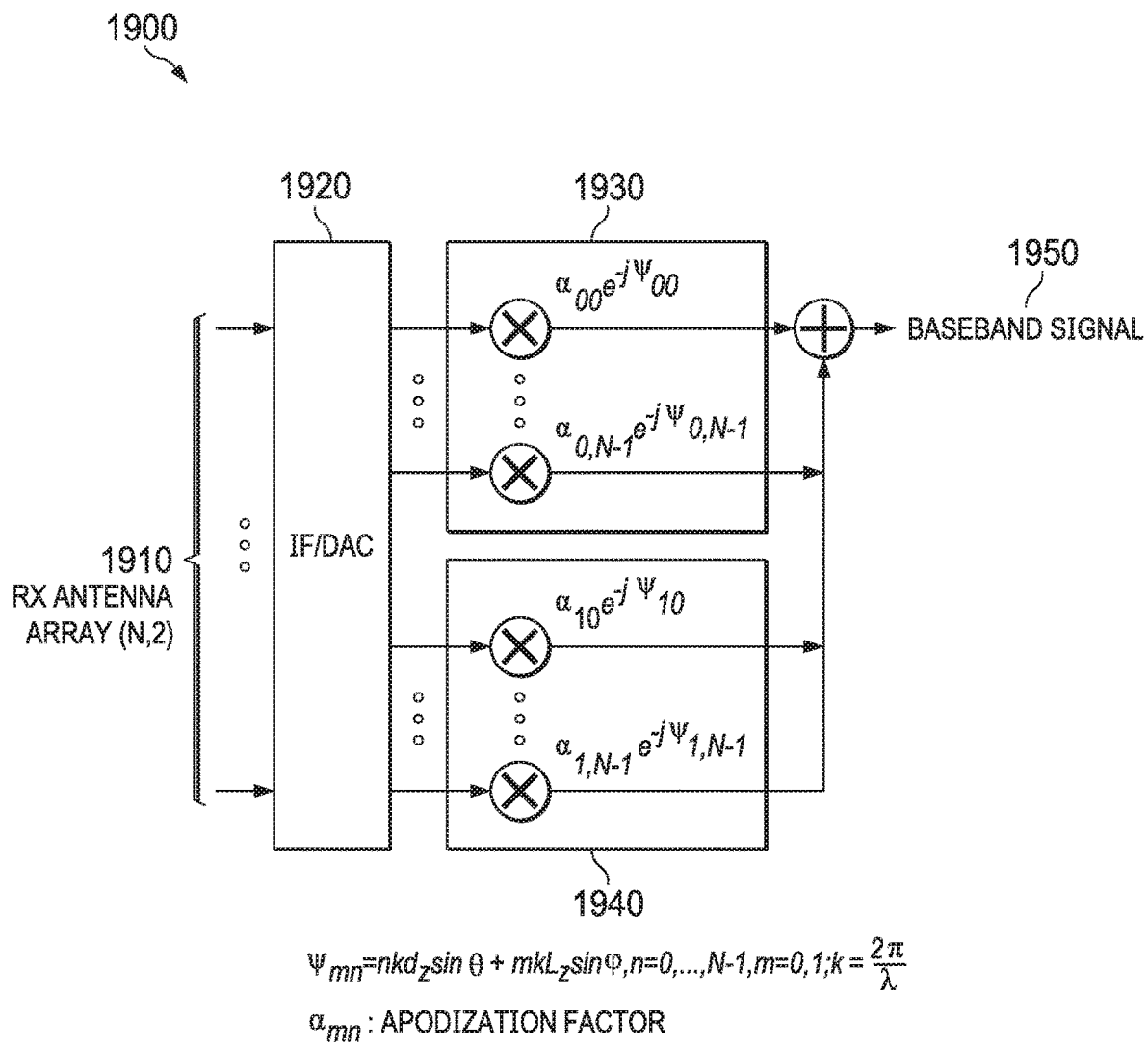
FIG. 19 illustrates an example receive beamforming according to embodiments of the present disclosure.
Figure 20:
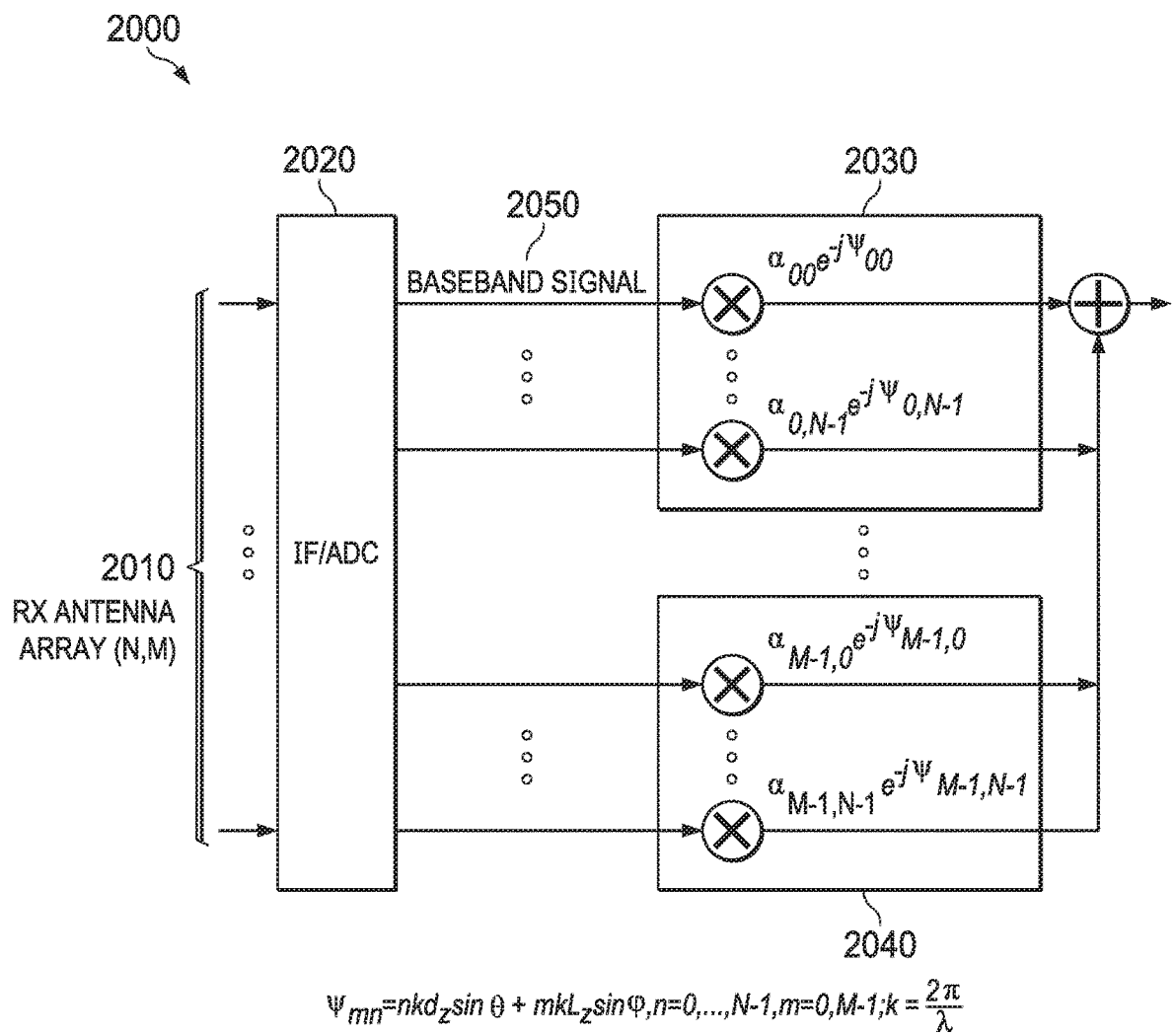
FIG. 20 illustrates an example receive beamforming with M antenna arrays according to embodiments of the present disclosure.

In one embodiment, for each antenna element location in aperture 1, an antenna element in aperture 2 moves along a y-axis while receiving signal reflected from a target object. In such embodiment, the signal for each antenna element is weighted according to beamforming equation illustrated in FIG. 18, FIG. 19, and FIG. 20, given by the present disclosure. In such embodiment, for each transmission from each antenna location in aperture 1, receptions from each of antenna element locations in aperture 2 is performed by sequentially moving the antenna element along a y-axis. The process is repeated for each antenna location in aperture 1.

Figure 13:
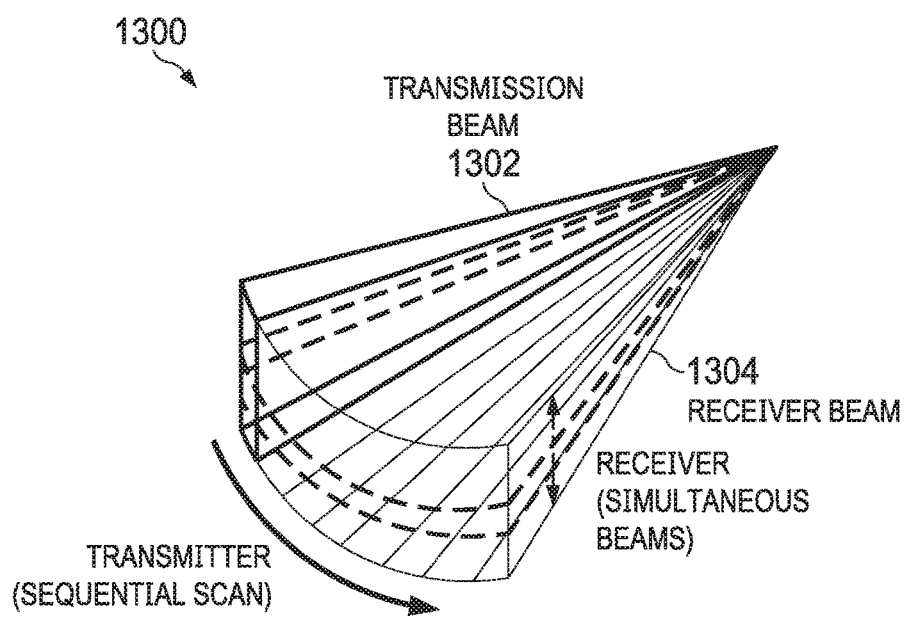
FIG. 13 illustrates an example beamformer illumination principle according to embodiments of the present disclosure.

FIG. 13 illustrates an example beamformer illumination principle 1300 according to embodiments of the present disclosure. The embodiment of the beamformer illumination principle 1300 illustrated in FIG. 13 is for illustration only. FIG. 13 does not limit the scope of this disclosure to any particular implementation.

As illustrated in FIG. 13, a target scene is illuminated with single beam transmission and multi-beam reception mode. In the single beam and multi-beam reception mode, transmission beams 1302 are illuminated at a transmitter in a sequential scan fashion and receive beams 1304 are illuminated simultaneously at a receiver. The receiver receives reflected and scattered signal simultaneously from multiple beams for each transmit scan. Reflection from multiple points for the target area is collected in this mode. The transmitter can form the multiple beams for multiple illumination simultaneously and each beam of the multiple beams transmits one of the waveforms generated with orthogonal polyphase codes providing a polyphase coding.

Figure 23:
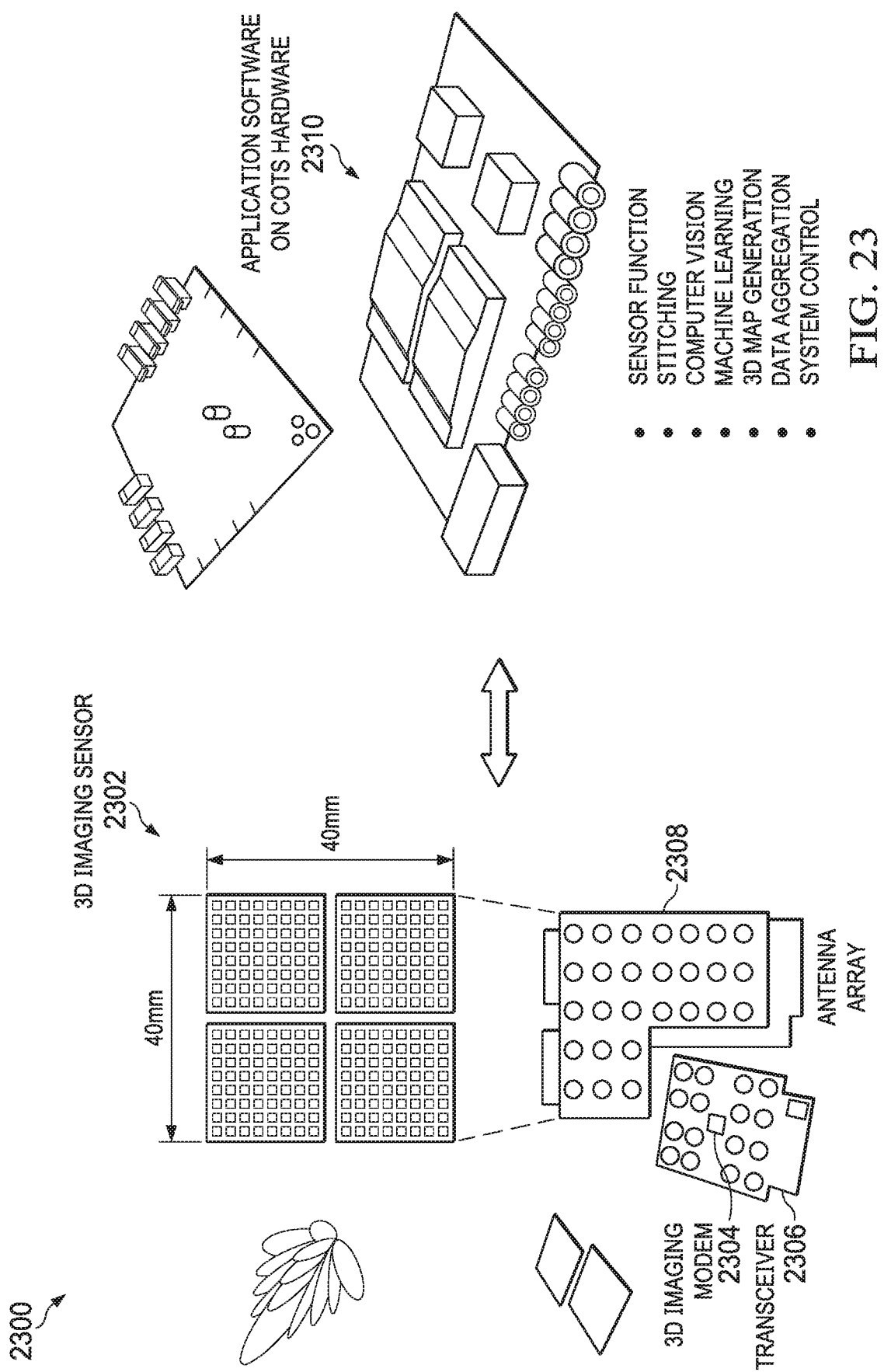
FIG. 23 illustrates an example sensor and application software according to embodiments of the present disclosure.

Hereafter, an advanced communication apparatus may refer a FIGS. 14, 15, and 16 providing hybrid beamforming operation based on all functional blocks described in FIGS. 14,15, and 16. In addition, FIGS. 14, 15, and 16 may be implemented in FIGS. 2 and 3 as a one of examples of a user equipment (UE) or a base station (BS, gNB). The advanced communication apparatus including transmit antenna array and receive antenna array as described in FIGS. 14, 15, and 16 (as illustrated also in 210a, 210b, and 210n of FIG. 2 and 310 of FIG. 3) further includes 3D imaging sensor as illustrated in FIG. 23.

FIG. 14 illustrates an example 3D imaging sensor with hybrid beamforming general 1400 according to embodiments of the present disclosure. The embodiment of the hybrid beamforming general 1400 illustrated in FIG. 14 is for illustration only. FIG. 14 does not limit the scope of this disclosure to any particular implementation.

In block 1402, a binary PN sequence or a polyphase sequence is generated. In block 1404, the sequence is digitally modulated. The modulator is performed in block 1402 and the modulation is one of a BPSK, QPSK, OOK, ASK, FSK, PPM, PSK, OFDM, and DPSK modulator. In block 1406, the modulated signal is digitally beamformed according to the equation illustrated in FIG. 18. In block 1408, the signal is converted to analog signal by IF and ADC. The analog signal is beamformed by analog phase shifter in block 1410, which is upconverted to the carrier frequency and transmitted by radiating antenna in block 1412.

The reflected and backscattered signal is received, from object 1413, at receive antenna in block 1414. In block 1416, the analog signal is beamformed by receiver analog phase shifter. The signal is down converted and converted to digital signal by IF and DAC in block 1418. In block 1420, the digital signal is digitally beamformed according to the equation illustrated in FIG. 19 and FIG. 20. In block 1422, the 4D image is generated by digital image formation algorithm. In 1424, the generated image is post-processed for detection and tracking.

As illustrated in FIG. 14, a hybrid beamformer circuit of a 3D imaging sensor comprises a sequence generation block, a modulation block, a digital beamforming (BF) block, an intermediate frequency (IF)/digital-analog converting (DAC) block, and an analog BF block. As illustrated in FIG. 14, the combined digital and analog beamformer is described as wideband precoding ($W_1$) which is divided into two parts as provided by equation 1:

$$W_1 = W_D T W_A \qquad \text{Equation (1)}$$

where WA: analog beamforming within antenna subarray; WD: digital beamforming matrix analog subarray; and T: D/A, IF/RF.

FIG. 15 illustrates an example hybrid beamforming with MIMO OFDM waveform 1500 (e.g., 3D imaging sensor) according to embodiments of the present disclosure. The embodiment of the hybrid beamforming with MIMO OFDM waveform 1500 illustrated in FIG. 15 is for illustration only. FIG. 15 does not limit the scope of this disclosure to any particular implementation.

In block 1502, one or more binary PN sequences or polyphase sequences are generated. In block 1504, the sequences are MIMO processed. In block 1506, the MIMO processed signal is processed by IFFT and CP is added. In block 1508, the signal is digitally beamformed according to the equation illustrated in FIG. 18. In block 1510, the signal is converted to analog signal by IF and ADC. The analog signal is beamformed by analog phase shifter in block 1512, which is upconverted to the carrier frequency and transmitted by radiating antenna 1513.

The reflected and backscattered signal is received, from object 1514, at receive antenna 1515. In block 1516, the analog signal is beamformed by a receiver analog phase shifter. The signal is down converted and converted to digital signal by IF and DAC in block 1518. In block 1520, the digital signal is digitally beamformed according to the equation illustrated in FIG. 19 and FIG. 20. In block 1522, the CP is removed, and the signal is processed by IFFT. In block 1524, the 4D image is generated by digital image formation algorithm. In 1526, the generated image is post-processed for detection and tracking.

As illustrated in FIG. 15, a hybrid beamformer circuit with OFDM waveform (e.g., 3D imaging sensor) comprises a sequence generation block, an inverse fast Fourier transform/cyclic-prefix (IFFT/CP) block, a digital BF block, an IF/DAC block, and an analog BF block. As illustrated in FIG. 15, a combined digital and analog beamformer is described as a wideband precoding ($W_1$) is determined. In such case, the wideband precoding ($W_1$) is divided into two parts as provided by equation (2):

$$W_1 = W_D T W_A \qquad \text{Equation (2)}$$

where WA: analog beamforming within antenna subarray; WD: digital beamforming matrix analog subarray; and T: D/A, IF/RF.

FIG. 16 illustrates an example hybrid beamforming implementation architecture with MIMO OFDM waveform 1600 (e.g., 3D imaging sensor) according to embodiments of the present disclosure. The embodiment of the hybrid beamforming with MIMO OFDM waveform 1600 illustrated in FIG. 16 is for illustration only. FIG. 16 does not limit the scope of this disclosure to any particular implementation.

In block 1602, one or more binary PN sequence(s) or polyphase sequence(s) are generated. In block 1604, the sequences are MIMO processed. In block 1606, the MIMO processed signal is processed by IFFT and CP is added. In block 1608, the signal is digitally beamformed according to the equation illustrated in FIG. 18. In block 1610, the signal is converted to analog signal by IF and ADC. The analog signal is beamformed by analog phase shifter in block 1612, which is upconverted to the carrier frequency and transmitted by radiating antenna 1613.

The reflected and backscattered signal is received, from object 1614, at receive antenna 1615. In block 1616, the analog signal is beamformed by a receiver analog phase shifter. The signal is down converted and converted to digital signal by IF and DAC in block 1618. In block 1620, the digital signal is digitally beamformed according to the equation illustrated in FIG. 19 and FIG. 20. In block 1622, the CP is removed, and the signal is processed by IFFT. In block 1624, the 4D image is generated by digital image formation algorithm. In 1526, the generated image is post-processed for detection and tracking.

As illustrated in FIG. 16, split implementation architecture for a front-end processing and a baseband processing is provided, for example for 3D imaging sensor. The front-end transceiver and baseband processing may be split into two chips. The front-end block includes an analog beamformer, an IF/ADC, and a DAC. The baseband processor includes signal processing. Multiple options are defined for the split implementation architecture between the front-end module (e.g., circuit) and a baseband processor.

In one embodiment of Option A, the analog beamforming and IF/ADC & DAC functions reside in the front-end block while all digital processing resides in the baseband processing block.

In another embodiment of Option B, the analog processing and digital beamforming reside in the front-end block while the rest of processing resides in the baseband processing block.

In yet another embodiment of Option C, the analog processing, the digital beamforming, FFT/IFFT, and CP removal reside in the front-end block. Further inclusion of radar signal processing such as range processing into the front-end block may be provided. As more processing is integrated in the front-end module, and the real-time data transfer requirements for the interface is reduced.

Figure 17:
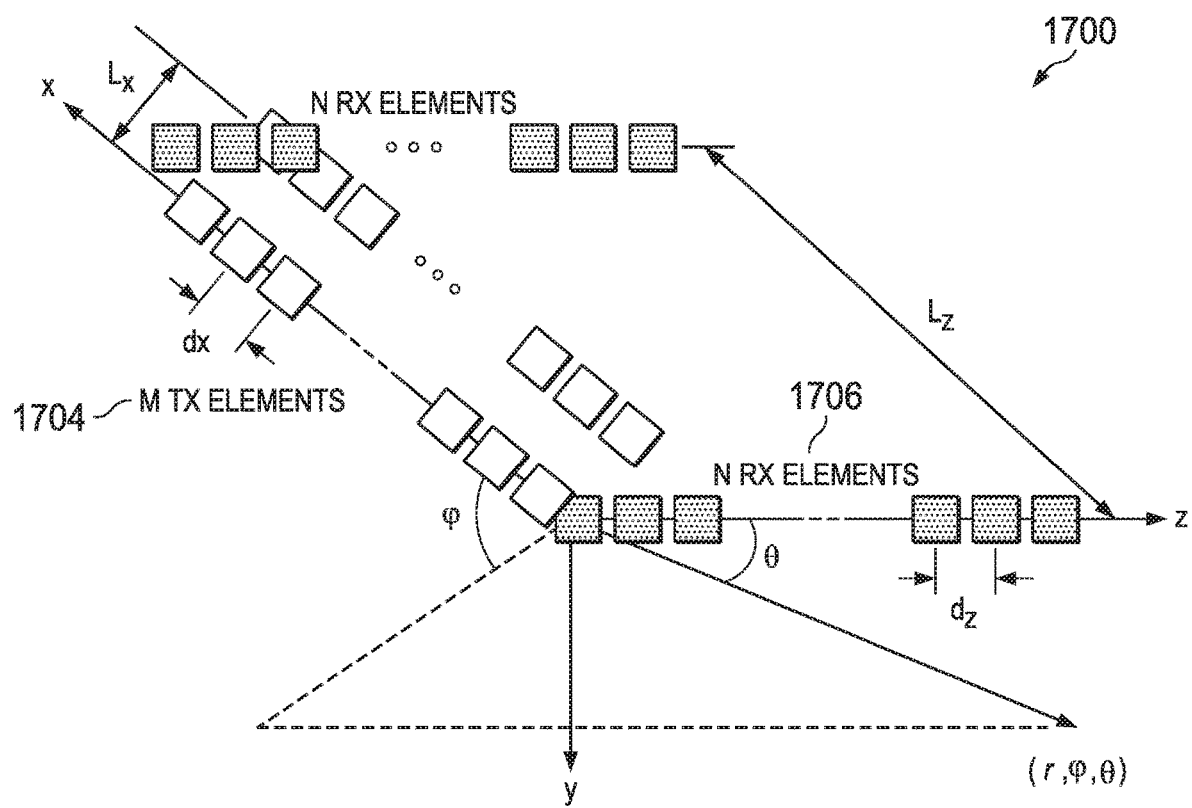
FIG. 17 illustrates an example beamforming geometry with 2D virtual antenna array according to embodiments of the present disclosure.

FIG. 17 illustrates an example beamforming geometry with 2D virtual antenna array 1700 according to embodiments of the present disclosure. The embodiment of the beamforming with virtual antenna array 1700 illustrated in FIG. 17 is for illustration only. FIG. 17 does not limit the scope of this disclosure to any particular implementation.

As illustrated in FIG. 17, the geometry of an example beamforming with a 2D virtual antenna array is provided. The transmit antenna array includes two rows of M transmit antenna elements separated by distance $d_x$ in Azimuth direction forming an antenna array. The two row arrays are parallel to each other and the distance between the two row arrays are $L_x$. The receiving antenna array includes 2 columns N receive antenna elements separated by distance $d_x$ in elevation direction forming an antenna array.

The two column arrays are parallel to each other and the distance between the two column arrays are $L_z$. The beamformer illuminates target at (r, φ, θ), where r is the distance to the target, and φ and θ are the beamforming angle in azimuth and elevation. The transmit antenna array and the receiving antenna does not need to be co-located as long as they illuminate the same target scene.

As illustrated in FIG. 17, a beamforming with 2D virtual antenna array is performed using one or more antenna arrays with M Tx element array 1704 and one or more antenna arrays with N Rx elements 1706.

FIG. 18 illustrates an example transmit beamforming 1800 according to embodiments of the present disclosure. The embodiment of the transmit beamforming 1800 illustrated in FIG. 18 is for illustration only. FIG. 18 does not limit the scope of this disclosure to any particular implementation.

As illustrated in FIG. 18, a Tx beamforming circuit 1800 includes a plurality of baseband signal inputs 1801 and an IF/DAC block connected to a plurality of Tx antenna arrays with (M, 2) elements composed of 2 rows of M-element antenna array. In FIG. 18, it is assumed that a simple antenna array with digital beamformer is considered. FIG. 1800 shows a transmit beamforming with 2 sets of M element antenna array. Block 1810 illustrates a signal processing for a transmit beamforming for a first row of M-element antenna array in baseband. Block 1820 illustrates a signal processing for a transmit beamforming for a second row of M-element antenna array in baseband. The baseband signal for m-th element and n-th row of the antenna array is multiplied by the apodization factor $\alpha_{mn}$ and the phase $e^{-j\psi_{mn}}$. After DAC 1830, the 2M signal paths are mapped to 2M antenna ports 1840 for up conversion and transmission. Where, $$\psi_{mn} = mkd_x \sin\varphi + nkL_x \sin\theta, m = 0, \ldots, M-1, n = 0, 1; k = \frac{2\pi}{\lambda}.$$

FIG. 19 illustrates an example receive beamforming 1900 according to embodiments of the present disclosure. The embodiment of the receive beamforming 1900 illustrated in FIG. 19 is for illustration only. FIG. 19 does not limit the scope of this disclosure to any particular implementation.

As illustrated in FIG. 19, the Rx beamforming circuit 1900 includes a plurality of Rx antenna arrays (N, 2) composed of 2 columns of N-element antenna array and an IF/ADC block comprising a plurality of output signals to be added to generate a baseband signal 1950.

As illustrated in FIG. 19, it is assumed that simple antenna array with digital beamformer is provided. FIG. 19 shows a receiver beamforming with 2 sets of N element antenna array. After reception from a receiver antenna element 1910 and ADC 1920, the 2N signals are processed in a baseband circuit. Block 1930 illustrates a receiver beamforming processing for a first column of N-element antenna array in the baseband circuit. Block 1940 illustrates a receiver beamforming processing for a first column of N-element antenna array in the baseband circuit. The baseband signal for n-th element and m-th column of the antenna array is multiplied by the apodization factor $\alpha_{mn}$ and the phase $e^{-j\psi_{mn}}$. Where, $$\psi_{mn} = nkd_z \sin\theta + mkL_z \sin\varphi, n = 0, \ldots, N-1, m = 0, 1; k = \frac{2\pi}{\lambda}.$$

FIG. 20 illustrates an example receive beamforming with M antenna arrays 2000 according to embodiments of the present disclosure. The embodiment of the receive beamforming with M antenna arrays 2000 illustrated in FIG. 20 is for illustration only. FIG. 20 does not limit the scope of this disclosure to any particular implementation.

FIG. 20 illustrates an example receive beamforming with M antenna arrays 2000, composed of M columns of N-element antenna array in accordance with the present disclosure.

As illustrated in FIG. 20, an Rx beamforming with an M antenna arrays circuit includes a plurality of Rx antenna arrays (N, M), and an IF/ADC block comprising a plurality of output signals to be added to generate a baseband signal 2050. In FIG. 20, it is assumed that a simple antenna array with a digital beamformer is provided. FIG. 20 shows a receiver beamforming with M sets of N element antenna array. After reception from a receiver antenna element 2010 and ADC 2020, the MN signals are processed in a baseband circuit. Block 2030 illustrates a receiver beamforming processing for a second column of N-element antenna array in the baseband circuit. Block 2040 illustrates a receiver beamforming processing for the (M−1)th column of N-element antenna array. The baseband signal for n-th element and m-th column of the antenna array is multiplied by the apodization factor $\alpha_{mn}$ and the phase $e^{-j\psi_{mn}}$. Where, $$\psi_{mn} = nkd_z \sin\theta + mkL_z \sin\varphi, n = 0, \ldots, N-1, m = 0, M-1; k = \frac{2\pi}{\lambda}.$$

Figure 21:
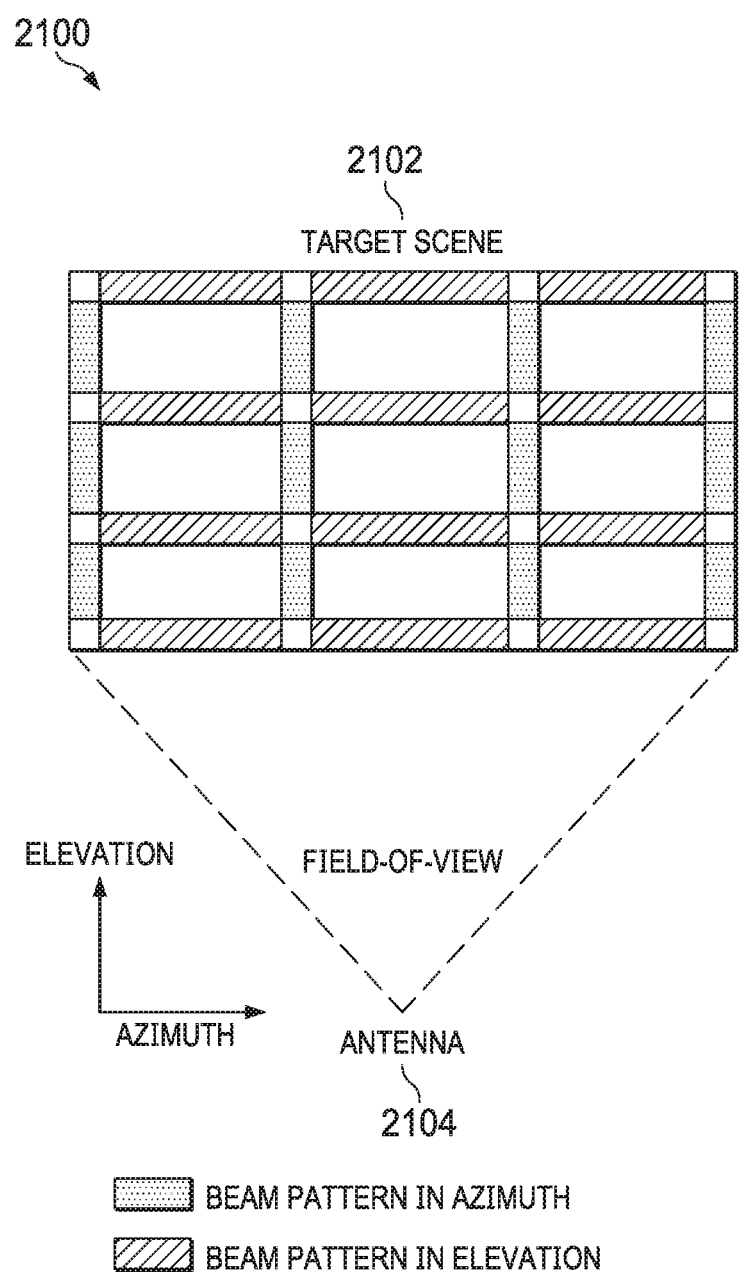
FIG. 21 illustrates an example multi-beam illumination and scheduling according to embodiments of the present disclosure.

FIG. 21 illustrates an example multi-beam illumination and scheduling 2100 according to embodiments of the present disclosure. The embodiment of the multi-beam illumination and scheduling 2100 illustrated in FIG. 21 is for illustration only. FIG. 21 does not limit the scope of this disclosure to any particular implementation.

FIG. 21 illustrates an example beam footprint of multi-beam illumination in MIMO/beamforming radar in accordance with the present disclosure.

As illustrated in FIG. 21, a multi-beam illumination and scheduling is determined in elevation and Azimuth. As illustrated in FIG. 21, a multiple-beam illumination in Azimuth at Tx is implemented with digital beamformer or Butler matrix. As illustrated in FIG. 20, 2, 4, or more simultaneous beams are illuminated in practice. As illustrated in FIG. 21, the multi-beam illumination and scheduling comprises a target scene 2102 and antenna 2104.

Receiver processes are simultaneously performed for multiple Azimuth and elevation angles. In such case, a receiver can process the entire field-of-view (FoV) in elevation. As illustrated in FIG. 21, a beam scheduling determines Azimuth and/or elevation angles based on a configuration parameter. In such case, the beam scheduling can be dynamically adjusted based on for example, tracking objects in certain areas.

As illustrated in FIG. 20, in a transmitter, orthogonal sequences generated from the same root sequence is mapped to each transmit beam. The transmit beam is generated by beamforming in an Azimuth direction, resulting in narrow beam in azimuth while illuminating the entire target scene in its antenna footprint. The receiver beam is generated by the antenna array in an elevation direction, resulting in narrow beam in elevation. A digital beamforming for a virtual receive array generates a narrow beam in Azimuth, improving azimuth resolution.

Figure 22:
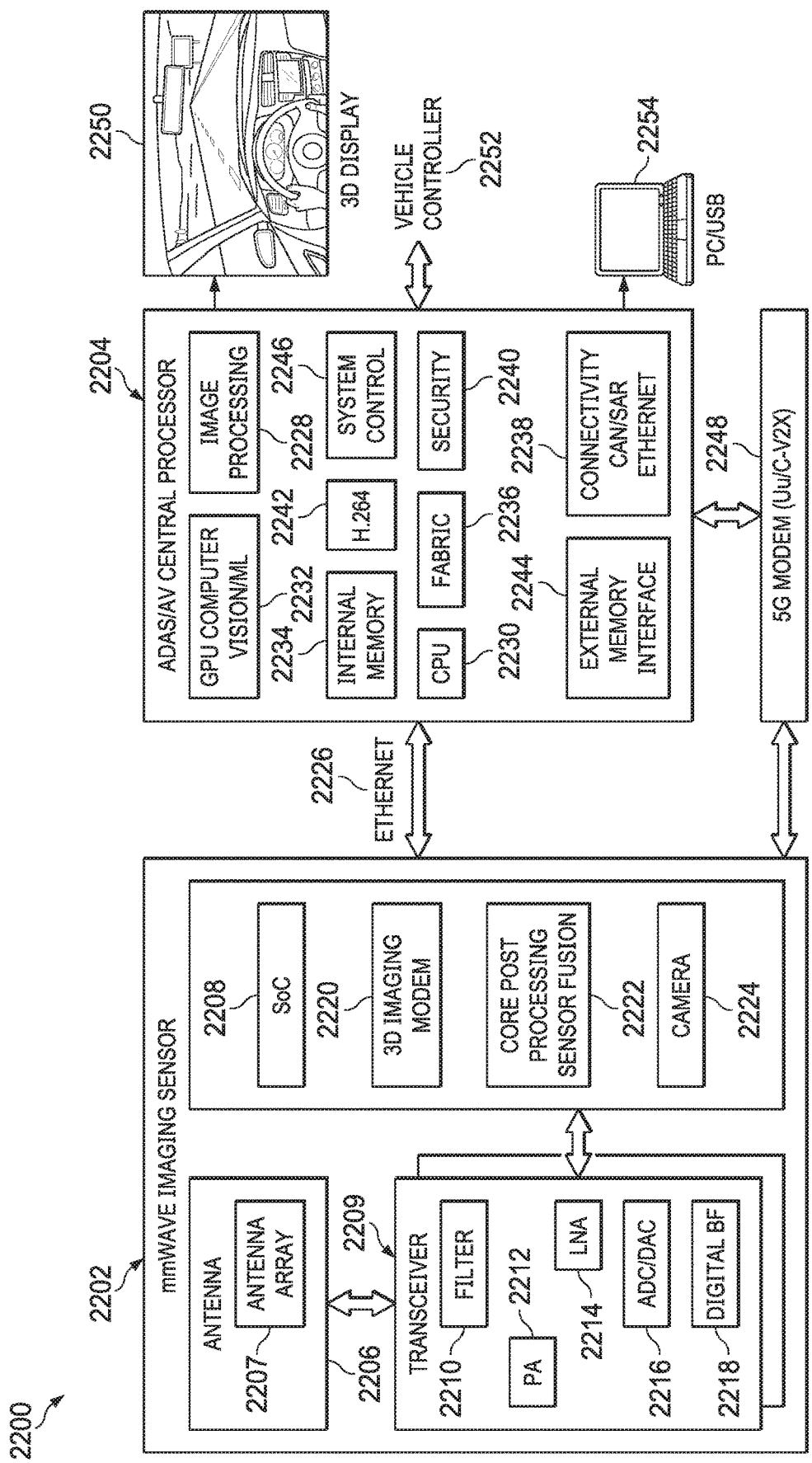
FIG. 22 illustrates an example apparatus according to embodiments of the present disclosure.

FIG. 22 illustrates an example apparatus 2200 according to embodiments of the present disclosure. The embodiment of the apparatus 2200 illustrated in FIG. 22 is for illustration only. FIG. 22 does not limit the scope of this disclosure to any particular implementation.

As illustrated in FIG. 22, an apparatus comprises a modem, a mmWave imaging sensor 2202, and an advanced driver assistance system/autonomous vehicle (ADAS/AV) central processor 2204. The ADAS/AV central processor may be connected with the mmWave imaging sensor through the network such as Ethernet 2226.

The ADAS/AV central processor 2204 is further connected to the modem 2248 (e.g., 5G modem Uu/C-V2X) that is connected to the mmWave imaging sensor 2202. The ADAS/AV central processor 2204 may be connected with a display 2250 and/or a computer 2254 (e.g., terminal, device, etc.) including at least one peripheral device. The ADAS/AV may be further connected with another processor 2252 (e.g., controller) that may be implemented in an external device and/or object (e.g., a vehicle).

The mmWave imaging sensor of the apparatus comprises an antenna block 2206 including antenna array 2207, a transceiver block 2209 including a filter 2210, a power amplifier (PA) 2212, a low noise amplifier (LNA) 2214, an analog to digital converter/digital to analog converter (ADC/DAV) 2216, and a digital beamforming (BF) 2218; and a system on chip (SoC) block 2208 including a 3D imaging modem 2220, core post processing sensor fusion 2222, and a camera 2224.

The ADAS/AV central processor 2204 of the apparatus comprises an image processing block 2228, a central processing unit (CPU) 2230, a graphics processing unit (GPU) computer vision/machine learning (ML) 2232, an internal memory 2234, a fabric 2236, a video codec H.264 2242, a connectivity controller area network (CAN)/SAR Ethernet 2238, a security block 2240, an external memory interface 2244, and a system control block 2246.

FIG. 23 illustrates an example sensor and application software 2300 according to embodiments of the present disclosure. The embodiment of the sensor and application software 2300 illustrated in FIG. 23 is for illustration only. FIG. 23 does not limit the scope of this disclosure to any particular implementation.

As illustrated in FIG. 23, an apparatus including a 3D imaging sensor 2302, a 3D imaging modem 2304, a transceiver 2306, and an antenna array 2308, and application software implemented on COTS hardware 2310 are configured for a sensor fusion, a stitching, a computer vision, machine learning, a 3D map generation, a data aggregation, and a system control.

Figure 24:
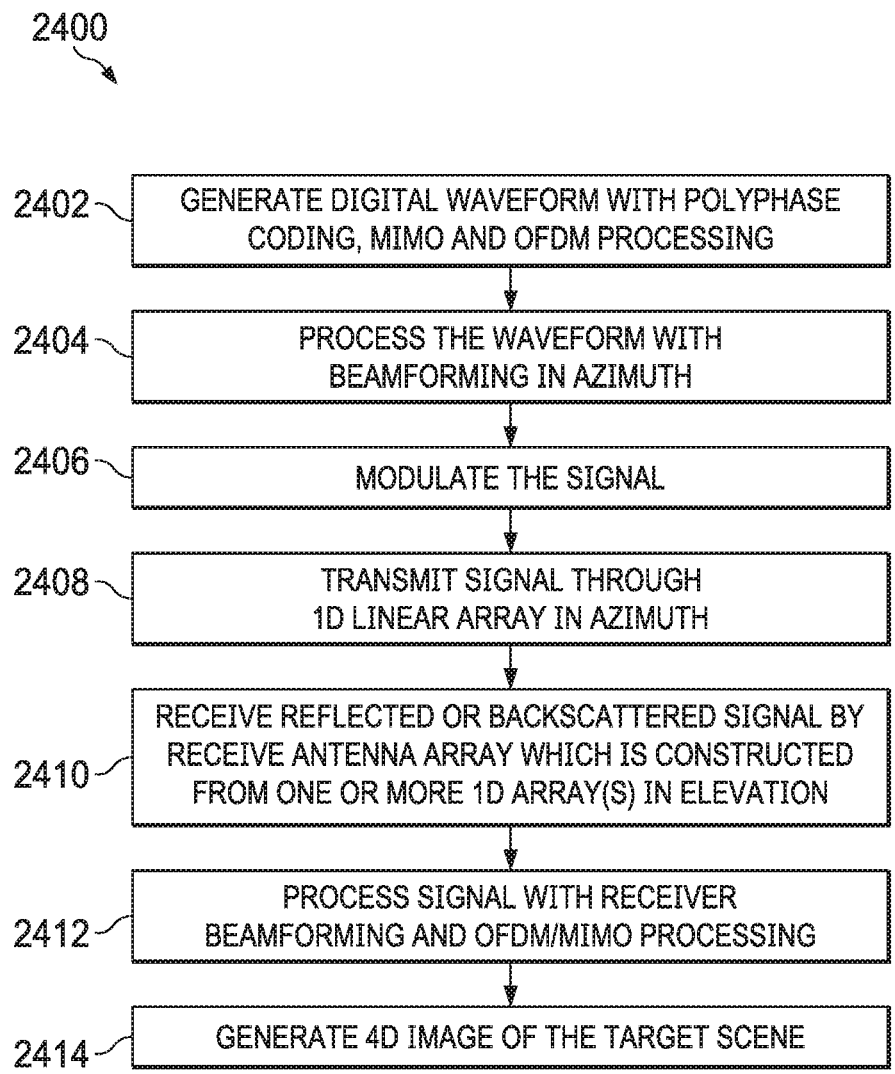
FIG. 24 illustrates a flowchart of a method for synthetic aperture antenna array design and beamforming for 3D imaging, localization, and positioning according to embodiments of the present disclosure.

FIG. 24 illustrates a flowchart of a method 2400 for synthetic aperture antenna array design and beamforming for 3D imaging, localization, and positioning according to embodiments of the present disclosure. The embodiment of the method 2400 illustrated in FIG. 24 is for illustration only. FIG. 24 does not limit the scope of this disclosure to any particular implementation.

As illustrated in FIG. 24, the method 2400 begins at step 2402. The method 2400 may be performed by a transceiver comprising a transmitter and a receiver adopting synthetic aperture antenna array for 3D imaging.

In step 2402, the method generates a digital waveform with a polyphase coding, and MIMO and OFDM processing. In one embodiment, a three-dimensional (3D) imaging sensor comprises a digital circuit that is configured to generate a digital waveform with a polyphase coding based on a multi-input multi-output (MIMO) and orthogonal frequency division multiplexing (OFDM) processing, In step 2404, the method digitally processes the waveform with beamforming in Azimuth. The beamformer can be digital, analog phase shifter or hybrid of digital and analog beamforming. In one embodiment, a 3D imaging sensor comprises a digital circuit that is configured to process the digital waveform with beamforming in Azimuth.

Next, the method in step 2406, the method modulates the signal. In one embodiment, a 3D imaging sensor comprises a digital circuit that is configured to modulate the processed digital waveform using a predetermined modulation function (e.g., modulation techniques, analog modulation and digital modulation, or combination of thereof).

Subsequently, in step 2408, the method 2400 transmits signal through 1D array in Azimuth. In one embodiment, a transceiver operably connected to the digital circuit and the processor, is configured to transmit, to a target object via a transmit antenna comprising at least one one-dimensional (1D) linear array in Azimuth, a first signal that is modulated by the predetermined modulation function.

In such embodiment, the transmit antenna further comprises at least one adjustable vertical antenna pointing an angle and field of view by transmit beamforming between at least two antenna arrays.

In such embodiment, a virtual array is determined based on an antenna panel for the transmit antenna comprising at least one element in Azimuth and at least one arrays in elevation, and at least one vertical arrays for the receive antenna.

In such embodiment, the virtual array is extended to include two or more transmit antenna arrays for at least one adjustable vertical antenna pointing an angle and field of view by transmit beamforming between at least two antenna arrays, the virtual array providing a 360-degree coverage.

In one embodiment, the method 2400 (e.g., a transceiver connected to a 3D imaging sensor in an advanced communication system) transmits, to the target object, the first signal using the transmit antenna comprising a first antenna aperture and receive the second signal using the receive antenna comprising a second antenna aperture.

In another embodiment, the method 2400 (e.g., a transceiver connected to a 3D imaging sensor in an advanced communication system) transmits, to the target object, the first signal using the transmit antenna comprising the second antenna aperture and receive the second signal using the receive antenna comprising the first antenna aperture.

In such embodiment, the target object is illuminated with a single beam transmission and multi-beam reception mode, at least one transmission beam being illuminated in a sequential scan fashion and at least one receive beam being illuminated simultaneously.

In such embodiment, at least one antenna element in the first antenna aperture moves along an x-axis during transmitting the first signal and at least one antenna element in the second antenna aperture moves along a y-axis during receiving the second signal.

Subsequently, the method in step 2410 receives the reflected or backscattered signal using a receive antenna array which is constructed from multiple 1D arrays in elevation. In one embodiment, the method 2400 (e.g., a transceiver operably connected to the digital circuit and the processor) receives a second signal via a receive antenna that is constructed from one or more 1D arrays in elevation, wherein the second signal is reflected or backscattered from the target object.

In such embodiment, the receive antenna further comprises a number of receive paths based on a number of receive antenna array columns (N) each of which comprises a one-dimensional (1D) linear array of size M in elevation.

In one embodiment, a digital circuit (e.g., 3D imaging circuit) is further configured to perform a hybrid beamforming partitioning between a digital domain and a radio-frequency (RF) domain (e.g., digital beamforming and analog beamforming as illustrated in FIGS. 14, 15, and 16).

In one embodiment, a 3D imaging sensor further comprises the digital circuit performing a digital beamforming and an analog processing circuit, and wherein the digital and analog processing circuit is located in a front-end circuit that separates from a baseband processing circuit comprising other processing circuits included in the 3D imaging sensor.

In another embodiment, a 3D imaging sensor further comprises the digital circuit performing a digital beamforming, an analog processing circuit, a fast Fourier transform/inverse fast Fourier transform (FFT/IFFT), and a cyclic prefix (CP) removal, and wherein the digital beamforming, the analog processing circuit, the FFT/IFFT, and the CP removal are located in a front-end circuit that separates from a baseband processing circuit comprising other processing circuits included in the 3D imaging sensor.

In step 2412, the receiver processes the signal by receiver beamforming and OFDM/MIMO processing. Finally, the method in step 2414 generates a 4D image of the target scene.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. An advanced communication apparatus in a wireless communication system, the advanced communication apparatus comprising:
    a processor;
    a three-dimensional (3D) imaging sensor operably connected to the processor, the 3D imaging sensor comprising an analog circuit and a digital circuit configured to:
        generate a digital waveform with a polyphase coding based on a multi-input multi-output (MIMO) and orthogonal frequency division multiplexing (OFDM) processing,
        process the digital waveform with beamforming in Azimuth, and
        modulate the processed digital waveform using a predetermined modulation function to generate a first signal; and
    a transceiver operably connected to the digital circuit and the processor, the transceiver configured to:
        transmit, to a target object via a transmit antenna comprising at least one one-dimensional (1D) linear array in Azimuth, the first signal, and
        receive a second signal via a receive antenna that is constructed from one or more 1D arrays in elevation, wherein the second signal is reflected or backscattered from the target object.

2. The advanced communication apparatus of claim 1, wherein the receive antenna further comprises a number of receive paths based on a number of receive antenna array columns (N) each of which comprises a one-dimensional (1D) linear array of size M in elevation.

3. The advanced communication apparatus of claim 1, wherein the at least one 1D linear array is at least one adjustable antenna pointing an angle and field of view of the transmit antenna, and wherein the at least one adjustable antenna is placed between at least two vertical arrays of the receive antenna.

4. The advanced communication apparatus of claim 1, wherein the transmit antenna and the receive antenna are formed on an antenna panel.

5. The advanced communication apparatus of claim 4, wherein transmit antenna arrays of the transmit antenna are used as a virtual array antenna comprising at least one adjustable antenna pointing an angle and field of view of the transmit antenna, the virtual array antenna providing a 360 degree coverage, and
wherein the at least one adjustable antenna is placed between at least two vertical arrays of the receive antenna.

6. The advanced communication apparatus of claim 1, wherein the transceiver is further configured to:
    transmit, to the target object, the first signal using the transmit antenna comprising a first antenna aperture and receive the second signal using the receive antenna comprising a second antenna aperture; or
    transmit, to the target object, the first signal using the transmit antenna comprising the second antenna aperture and receive the second signal using the receive antenna comprising the first antenna aperture, and
    wherein at least one antenna element in the first antenna aperture moves along an x-axis during transmitting the first signal and at least one antenna element in the second antenna aperture moves along a y-axis during receiving the second signal.

7. The advanced communication apparatus of claim 1, wherein the target object is illuminated with a single beam transmission and multi-beam reception mode, at least one transmission beam being illuminated in a sequential scan fashion and at least one receive beam being illuminated simultaneously.

8. The advanced communication apparatus of claim 1, wherein the digital circuit is further configured to perform a hybrid beamforming partitioning between a digital domain and a radio-frequency (RF) domain.

9. The advanced communication apparatus of claim 1, wherein the digital circuit is further configured to perform a digital beamforming, and wherein the digital circuit and the analog circuit are located in a front-end circuit that is different from a baseband circuit comprising other circuits included in the 3D imaging sensor.

10. The advanced communication apparatus of claim 1, wherein the 3D imaging sensor further comprises a first circuit to perform a fast Fourier transform/inverse fast Fourier transform (FFT/IFFT) and a second circuit to perform a cyclic prefix (CP) removal, and
    wherein the digital circuit performing a digital beamforming, the analog circuit, the first circuit, and the second circuit are located in a front-end circuit that is different from a baseband circuit comprising other circuits included in the 3D imaging sensor.

11. A method of an advanced communication apparatus in a wireless communication system, the method comprising:
    generating a digital waveform with a polyphase coding based on a multi-input multi-output (MIMO) and orthogonal frequency division multiplexing (OFDM) processing;
    processing the digital waveform with beamforming in Azimuth;
    modulating the processed digital waveform using a predetermined modulation function to generate a first signal;
    transmitting, to a target object via a transmit antenna comprising at least one one-dimensional (1D) linear array in Azimuth, the first signal; and
    receiving a second signal via a receive antenna that is constructed from one or more 1D arrays in elevation, wherein the second signal is reflected or backscattered from the target object.

12. The method of claim 11, wherein the receive antenna further comprises a number of receive paths based on a number of receive antenna array columns (N) each of which comprises a one-dimensional (1D) linear array of size M in elevation.

13. The method of claim 11, wherein the at least one 1D linear array is at least one adjustable antenna pointing an angle and field of view of the transmit antenna, and wherein the at least one adjustable antenna is placed between at least two vertical arrays of the receive antenna.

14. The method of claim 11, wherein the transmit antenna and the receive antenna are formed on an antenna panel.

15. The method of claim 14, wherein transmit antenna arrays of the transmit antenna are used as a virtual array antenna comprising at least one adjustable antenna pointing an angle and field of view of the transmit antenna, the virtual array antenna providing a 360 degree coverage, and
wherein the at least one adjustable antenna is placed between at least two vertical arrays of the receive antenna.

16. The method of claim 11, further comprising:
transmitting, to the target object, the first signal using the transmit antenna comprising a first antenna aperture and receive the second signal using the receive antenna comprising a second antenna aperture; or
transmitting, to the target object, the first signal using the transmit antenna comprising the second antenna aperture and receive the second signal using the receive antenna comprising the first antenna aperture,
wherein at least one antenna element in the first antenna aperture moves along an x-axis during transmitting the first signal and at least one antenna element in the second antenna aperture moves along a y-axis during receiving the second signal.

17. The method of claim 11, wherein the target object is illuminated with a single beam transmission and multi-beam reception mode, at least one transmission beam being illuminated in a sequential scan fashion and at least one receive beam being illuminated simultaneously.

18. The method of claim 11, further comprising performing a hybrid beamforming partitioning between a digital domain and a radio-frequency (RF) domain.

19. The method of claim 11, further comprising performing a digital beamforming via a digital circuit,
wherein the digital circuit and an analog circuit are located in a front-end circuit that is different from a baseband circuit comprising other circuits included in a three-dimensional (3D) imaging sensor.

20. The method of claim 11, further comprising:
performing a fast Fourier transform/inverse fast Fourier transform (FFT/IFFT) via a first circuit; and
performing a cyclic prefix (CP) removal via a second circuit,
wherein a digital circuit performing a digital beamforming, an analog circuit, the first circuit, and the second circuit are located in a front-end circuit that is different from a baseband circuit comprising other circuits included in a three-dimensional (3D) imaging sensor.

* * * * *